(12) United States Patent
Sun et al.

(10) Patent No.: US 11,962,522 B2
(45) Date of Patent: Apr. 16, 2024

(54) COMMUNICATION METHOD AND COMMUNICATIONS APPARATUS

(71) Applicant: HUAWEI TECHNOLOGIES CO., LTD., Guangdong (CN)

(72) Inventors: Hao Sun, Xi'ian (CN); Wenwen Huang, Shanghai (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 586 days.

(21) Appl. No.: 17/172,396

(22) Filed: Feb. 10, 2021

(65) Prior Publication Data

US 2021/0167906 A1 Jun. 3, 2021

Related U.S. Application Data

(63) Continuation of application No. PCT/CN2019/099037, filed on Aug. 2, 2019.

(30) Foreign Application Priority Data

Aug. 10, 2018 (CN) .......................... 201810910306.9

(51) Int. Cl.
*H04L 5/00* (2006.01)
*H04B 7/06* (2006.01)
(Continued)

(52) U.S. Cl.
CPC ......... *H04L 5/0012* (2013.01); *H04B 7/0626* (2013.01); *H04L 1/1819* (2013.01);
(Continued)

(58) Field of Classification Search
CPC ... H04L 5/0012; H04L 1/1819; H04L 5/0055; H04L 5/0044; H04L 5/0051;
(Continued)

(56) References Cited

U.S. PATENT DOCUMENTS

| | | |
|---|---|---|
| 9,974,064 B2 | 5/2018 | Han et al. |
| 2016/0050655 A1 | 2/2016 | Aiba et al. |

(Continued)

FOREIGN PATENT DOCUMENTS

| | | |
|---|---|---|
| CN | 105406944 A | 3/2016 |
| CN | 106464455 A | 2/2017 |

(Continued)

OTHER PUBLICATIONS

LG Electronics, "Two alternatives to split encoded UCI bits between two PUSCH hops", Feb. 26, 2018, 3GPP, R1-1803542. (Year: 2018).*

(Continued)

*Primary Examiner* — Peter P Chau
(74) *Attorney, Agent, or Firm* — Fish & Richardson P.C.

(57) ABSTRACT

The present disclosure relates to communication methods in a UCI-only scenario. One example method includes receiving downlink control information used to schedule a PUSCH, where the PUSCH includes a first frequency hopping resource and a second frequency hopping resource, and a time-domain start symbol of the first frequency hopping resource is before a time-domain start symbol of the second frequency hopping resource, and sending first UCI on the PUSCH, where the first UCI includes at least one of an HARQ-ACK, CSI-part1, or CSI-part2, where a quantity $G^{CSI-part1}(1)$ of coded bits that are of the CSI-part1 in the first UCI and that are mapped onto the first frequency hopping resource is a smaller one of a fourth value and a fifth value.

8 Claims, 9 Drawing Sheets

(51) Int. Cl.
*H04L 1/1812* (2023.01)
*H04W 28/26* (2009.01)
*H04W 72/0446* (2023.01)
*H04W 72/21* (2023.01)

(52) U.S. Cl.
CPC ........... *H04L 5/0055* (2013.01); *H04W 28/26* (2013.01); *H04W 72/0446* (2013.01); *H04W 72/21* (2023.01)

(58) Field of Classification Search
CPC ... H04L 5/0053; H04L 1/0072; H04L 1/1671; H04B 7/0626; H04W 28/26; H04W 72/0446; H04W 72/21; H04W 72/1263; H04W 72/20
See application file for complete search history.

(56) References Cited

U.S. PATENT DOCUMENTS

| | | | |
|---|---|---|---|
| 2018/0176892 A1 | 6/2018 | Kim et al. | |
| 2019/0116588 A1* | 4/2019 | Xiong | H04L 5/0048 |
| 2019/0166597 A1* | 5/2019 | Xiong | H04L 1/1812 |
| 2019/0199477 A1* | 6/2019 | Park | H04W 72/1268 |
| 2019/0222395 A1* | 7/2019 | Larsson | H04L 5/0053 |
| 2019/0342046 A1* | 11/2019 | Guo | H04L 5/0048 |

FOREIGN PATENT DOCUMENTS

| | | |
|---|---|---|
| CN | 106464479 A | 2/2017 |
| CN | 107852321 A | 3/2018 |
| CN | 108111263 A | 6/2018 |
| CN | 108112076 A | 6/2018 |
| RU | 2562455 C2 | 9/2015 |
| RU | 2575414 C2 | 2/2016 |
| WO | 2011137408 A2 | 11/2011 |
| WO | 2017019132 A1 | 2/2017 |
| WO | 2017132593 A1 | 8/2017 |
| WO | 2017171307 A1 | 10/2017 |

OTHER PUBLICATIONS

Nokia, "Remaining open items on UCI multiplexing", Apr. 16-20, 2018, 3GPP, R1-1804460. (Year: 2018).*
Qualcomm, "Summary of remaining issues for overlapping UL transmissions", May 21-25, 2018, 3GPP, R1-1807820. (Year: 2018).*
Huawei, "UL Multiplexing for URLLC", May 21-25, 2018, 3GPP, R1-1806893. (Year: 2018).*
1 Office Action issued in Chinese Application No. 201980053990.6 dated Jan. 4, 2022, 11 pages.
3GPP TS 38.212 V15.2.0 (Jun. 2018), "3rd Generation Partnership Project; Technical Specification Group Radio Access Network;NR;Multiplexing and channel coding(Release 15)," Jun. 2018, 98 pages.
3gpp TS 38.213 V15.2.0 (Jun. 2018), "3rd Generation Partnership Project; Technical Specification Group Radio Access Network; NR;Physical layer procedures for control(Release 15)," Jun. 2018, 99 pages.
Huawei, "CR to 38.212 capturing the RAN1#92bis and RAN1#93 meeting agreements, " 3GPP TSG RAN WG1 Meeting #93, R1-1807956, Busan, Korea, May 21-25, 2018, 3 pages.
PCT International Search Report and Written Opinion issued in International Application No. PCT/CN2019/099037 dated Oct. 29, 2019, 19 pages (with English translation).
Qualcomm Incorporated, "Summary of remaining issues for overlapping UL transmissions," 3GPP TSG RAN WG1 Meeting #93, R1-1807773, Busan, Korea, May 21-25, 2018, 14 pages.
3GPP TS 36.212 V15.2.0 (Jun. 2018), "3rd Generation Partnership Project; Technical Specification Group Radio Access Network; Evolved Universal Terrestrial Radio Access (E-UTRA); Multiplexing and channel coding (Release 15)" Jun. 2018, 245 pages.
MediaTek Inc., "Remaining issues of UCI on PUSCH [online], " 3GPP TSG RAN WG1 #92, R1-1801662, Athens, Greece, Feb. 26-Mar. 2, 2018, 5 pages.
Nokia, Nokia Shanghai Bell, "On UCI multiplexing," 3GPP TSG RAN WG1 #93, R1-1806927, Busan, Korea, May 21-25, 2018, 7 pages.
Office Action issued in Japanese Application No. 2021-506735 dated Mar. 22, 2022, 6 pages (with English translation).
Extended European Search Report issued in European Application No. 19848753.0 dated Oct. 11, 2021, 10 pages.
Qualcomm Incorporated, "Multiplexing of PUCCH and Pusch," 3GPP TSG RAN WG1 Meeting 91, R1-1721387, Reno, USA, Nov. 27- Dec. 1, 2017, 11 pages.
MediaTek Inc., "Remaining Issues of UCI on PUSCH," 3GPP TSG RAN WG1 Meeting AH 1801, R1-1800162, Vancouver, Canada, Jan. 22-26, 2018, 20 pages.
Huawei et al., "UCI Piggyback on PUSCH for URLLC," 3GPP TSG RAN WG1 Meeting #92, R1-1801357, Athens, Greece, Feb. 26-Mar. 2, 2018, 10 pages.
Office Action in Chinese Appln. No. 201810910306.9, dated Feb. 25, 2023, 11 pages.
Office Action issued in Russian Application No. 2021105828/07(012673) dated Jun. 2022, 5 pages (English translation).
EPO Communication under Rule 71(3) EPC issued in European Application No. 19848753.0 dated Jun. 22, 2022, 7 pages.
Ericsson, "On UCI Multiplexing on PUSCH," 3GPP TSG-RAN WG1 Meeting #93, Tdoc R1-1807253, Busan, Korea, May 21-25, 2018, 6 pages.
Huawei, HiSilicon, "Remaining issues on UCI multiplexing, " 3GPP TSG RAN WG1 Meeting #93, R1-1805887, Busan, Korea, May 21-25, 2018, 8 pages.
Office Action issued in Chinese Application No. 201980053990.6 dated Jun. 15, 2022, 8 pages (with English translation).
Samsung, "Corrections on UCI Multiplexing in PUSCH," 3GPP TSG RAN WG1 #93, R1-1806735, Busan, Korea, May 21-25, 2018, 4 pages.
Vivo, "Remaining issues on UCI multiplexing for eMBB," 3GPP TSG RAN WG1 Meeting #93, R1-1806063, Busan, Korea, May 21-25, 2018, 5 pages.
ZTE, "Remaining issues for multiplexing UCI on PUSCH," 3GPP TSG RAN WG1 Meeting #93, R1-1806133, Busan, Korea, May 21-25, 2018, 12 pages.

* cited by examiner

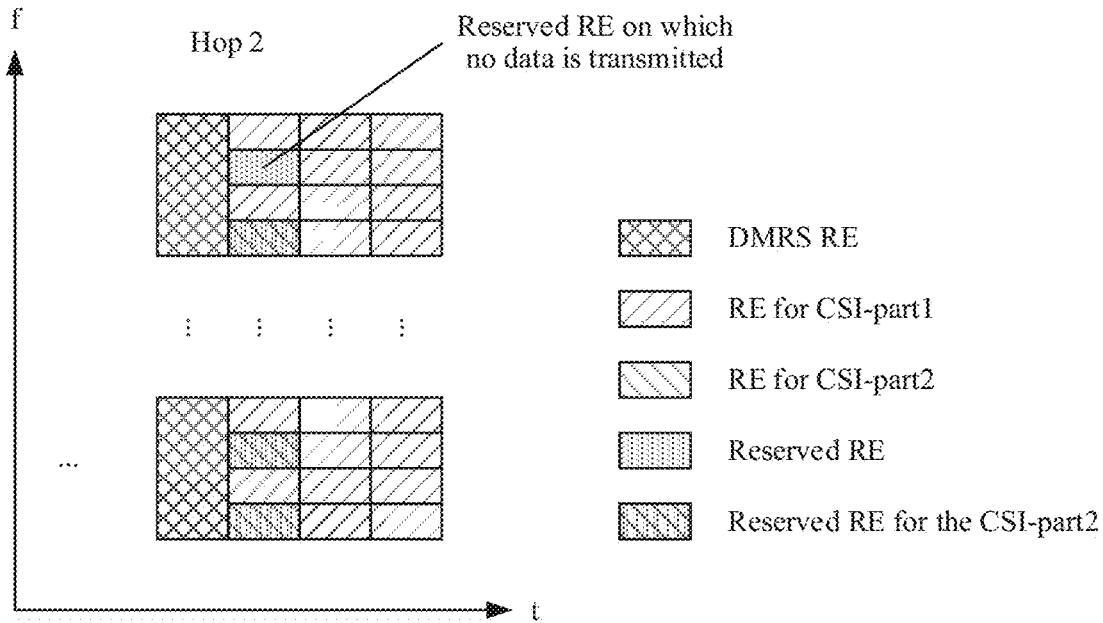

Receive downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is located before a time-domain start symbol of the second frequency hopping resource ⎯ S410

Send first UCI on the PUSCH, where the first UCI includes at least one of an HARQ-ACK, CSI-part1, and CSI-part2, where a quantity of coded bits mapped onto a reserved RE in the first frequency hopping resource is a first value, a quantity of coded bits mapped onto a reserved RE in the second frequency hopping resource is a second value, the first value is not less than the second value, and the reserved RE in the first frequency hopping resource and the reserved RE in the second frequency hopping resource are reserved for potential HARQ-ACK transmission in which a bit quantity is not greater than 2 ⎯ S420

Send downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is located before a time-domain start symbol of the second frequency hopping resource — S710

Receive first UCI on the PUSCH, where the first UCI includes at least one of an HARQ-ACK, CSI-part1, and CSI-part2, where a quantity of coded bits mapped onto a reserved RE in the first frequency hopping resource is a first value, a quantity of coded bits mapped onto a reserved RE in the second frequency hopping resource is a second value, the first value is not less than the second value, and the reserved RE in the first frequency hopping resource and the reserved RE in the second frequency hopping resource are reserved for potential HARQ-ACK transmission in which a bit quantity is not greater than 2 — S720

Send downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is located before a time-domain start symbol of the second frequency hopping resource — S810

Receive first UCI on the PUSCH, where the first UCI includes at least one of an HARQ-ACK, CSI-part1, and CSI-part2 — S820

FIG. 8

COMMUNICATION METHOD AND COMMUNICATIONS APPARATUS

CROSS-REFERENCE TO RELATED APPLICATIONS

This application is a continuation of International Application No. PCT/CN2019/099037, filed on Aug. 2, 2019, which claims priority to Chinese Patent Application No. 201810910306.9, filed on Aug. 10, 2018. The disclosures of the aforementioned applications are hereby incorporated by reference in their entireties.

TECHNICAL FIELD

This application relates to the communications field, and in particular, to a communication method and a communications apparatus.

BACKGROUND

In a 5th generation (5G) mobile communications system, transmission of uplink control information. (UCI) is supported on a physical uplink shared channel (PUSCH), and there is a scenario in which only the UCI is sent and the uplink shared channel (UL-SCH) is not sent, that is, there is a UCI-only scenario.

In the UCI-only scenario, the sent UCI includes a hybrid automatic repeat request-acknowledgement (hybrid automatic repeat request-acknowledgement, HARQ-ACK), a channel state information part 1 (CSI-part1), and a channel state information part 2 (CSI-part2). Requirements of the three types of information for a protection level are lowered in the foregoing order. Therefore, when mapping the foregoing three types of information to resources, the terminal device sequentially maps, based on channel estimation quality, the HARQ-ACK, the CSI-part and the CSI-part2 to resource elements (RE) that can carry data and that are of the PUSCH.

To obtain a frequency hopping gain, the PUSCH may be divided into two parts in time domain, where the two parts are respectively referred to as a first hop (hop 1) and a second hop (hop 2). To obtain a maximum frequency hopping gain, frequency domain resources on the hop 1 and the hop 2 are generally far away from each other and at least do not exactly overlap. Correspondingly, the HARQ-ACK, the CSI-part1 and the CSI-part2 are also mapped to the hop 1 and the hop 2 according to a preset rule. However, information in the CSI-part1 mapped to the frequency hopping resources is incompletely sent, that is, a part of the CSI-part1 fails to be transmitted. This adversely affects application of UCI transmission through frequency hopping in the UCI-only scenario.

SUMMARY

This application provides a communication method and a communications apparatus. A CSI-part1 mapping rule is changed, to resolve a problem that due to UCI transmission through frequency hopping in a UCI-only scenario, information in CSI-part1 is incompletely sent.

According to a first aspect, a communication method is provided, and includes: receiving downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is before a time-domain start symbol of the second frequency hopping resource; and sending first UCI on the PUSCH, where the first UCI includes at least one of an HARQ-ACK, CSI-part1, and CSI-part2, where a quantity of coded bits that can be mapped onto reserved REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for transmitting potential HARQ-ACK which has less than or equal to 2 bits. A peer device of the device that performs the foregoing method may correspondingly perform steps of sending the downlink control information and receiving the first UCI on the PUSCH. It should be noted herein that, that the PUSCH includes a first frequency hopping resource and a second frequency hopping resource means that when a frequency hopping identifier field in uplink grant (UL grant) DCI indicated by a network device enables frequency hopping for the PUSCH, a time-frequency domain resource of the PUSCH in a first hop and a time-frequency domain resource of the PUSCH in a second hop are respectively referred to as the first frequency hopping resource and the second frequency hopping resource. To distinguish between the first frequency hopping resource and the second frequency hopping resource of the PUSCH in this application, there is a sequential relationship between a start time of the first frequency hopping resource and a start time of the second frequency hopping resource. In addition, a value of a quantity of coded bits mapped onto a specific quantity of REs of the PUSCH is equal to the quantity of REs multiplied by a quantity of transmission layers of the PUSCH and then multiplied by a modulation order of UCI potentially transmitted on the PUSCH.

A reason that information in the CSI-part1 is incompletely sent is that a quantity of coded bits that are of the CSI-part1 and that are mapped onto the second frequency hopping resource is relatively small. In other words, a quantity of REs on the second frequency hopping resource that are used to map the CSI-part1 is relatively small, and consequently, the CSI-part1 cannot be all mapped onto the second frequency hopping resource. Compared with the prior art, this application reduces a quantity of coded bits that are capable of being mapped onto reserved REs in the second frequency hopping resource, thereby increasing a quantity of REs that are in the second frequency hopping resource and that are used to map the CSI-part1. This resolves a problem that due to UCI transmission through frequency hopping in a UCI-only scenario, information in the CSI-part1 is incompletely sent.

Optionally, the method further includes: determining a first quantity $G_{rvd}^{ACK}$ of coded bits, where $G_{rvd}^{ACK}$ is a sum of the quantities of coded bits mapped onto the reserved REs in the first frequency hopping resource and the second frequency hopping resource, and both the first value and the second value are determined based on $G_{rvd}^{ACK}$.

The "sum of the quantities of coded bits mapped onto the reserved REs in the first frequency hopping resource and the second frequency hopping resource" refers to a sum of a quantity of coded bits that are capable of being mapped onto the reserved RE in the first frequency hopping resource and a quantity of coded bits that are capable of being mapped onto the reserved RE in the second frequency hopping resource, but should not be understood as a sum of a quantity of coded bits actually mapped onto the reserved RE in the first frequency hopping resource and a quantity of coded bits actually mapped onto the reserved RE in the second frequency hopping resource.

Optionally, the first value is $G_{rvd}^{ACK}(1)$, and $G_{rvd}^{ACK}(1) = N_L \cdot Q_m \cdot \lceil G_{rvd}^{ACK}/(2 \cdot N_L \cdot Q_m) \rceil$; and/or the second value is $G_{rvd}^{ACK}(2)$, and $G_{rvd}^{ACK}(2) = N_L \cdot Q_m \cdot \lfloor G_{rvd}^{ACK}/(2 \cdot N_L \cdot Q_m) \rfloor$, where $N_L$ is a quantity of transmission layers of the PUSCH, and $Q_m$ is a modulation order of the first UCI, namely, a modulation order of the UCI transmitted on the PUSCH.

Optionally, $G_{rvd}^{ACK}(1) = N_L \cdot Q_m \cdot \lceil G_{rvd}^{ACK}/(2 \cdot N_L \cdot Q_m) \rceil$, and $G_{rvd}^{ACK}(2) = G_{rvd}^{ACK} - G_{rvd}^{ACK}(1)$; or $G_{rvd}^{ACK}(2) = N_L \cdot Q_m \cdot \lfloor G_{rvd}^{ACK}/(2 \cdot N_L \cdot Q_m) \rfloor$, and $G_{rvd}^{ACK}(1) = G_{rvd}^{ACK} - G_{rvd}^{ACK}(2)$.

Optionally, the method further includes: determining a quantity $G^{ACK}$ of coded bits of the HARQ-ACK in the first UCI, where a quantity of coded bits that are of the HARQ-ACK in the first UCI and that are mapped onto the first frequency hopping resource is $G^{ACK}(1)$, and a value of $G^{ACK}(1)$ is a smaller one of the following two values:

a quantity of coded bits mapped onto an RE that is after a first group of consecutive demodulation reference signal (demodulation reference signal, DMRS) symbols on the first frequency hopping resource and that are capable of being used to carry data, and a third value that is determined based on $G^{ACK}$.

If the quantity of coded bits that are of the HARQ-ACK in the first UCI and that are capable of being mapped onto the first frequency hopping resource exceeds a bearer capability of the first frequency hopping resource, a terminal device may determine, based on the bearer capability of the first frequency hopping resource, the quantity of coded bits that are of the HARQ-ACK in the first UCI and that are mapped onto the first frequency hopping resource. Otherwise, the terminal device may determine, based on the quantity (for example, $N_L \cdot Q_m \cdot \lceil G_{rvd}^{ACK}/(2 \cdot N_L \cdot Q_m) \rceil$) of coded bits that are of the HARQ-ACK in the first UCI and that are capable of being mapped onto the first frequency hopping resource, the quantity of coded bits that are of the HARQ-ACK and that are mapped onto the first frequency hopping resource.

Optionally, a value of the quantity of coded bits mapped onto the RE that is after the first group of consecutive DMRS symbols on the first frequency hopping resource and that are capable of being used to carry data is equal to $M_3 \cdot N_L \cdot Q_m$, where $M_3$ is a quantity of REs that are after the first group of consecutive DMRS symbols on the first frequency hopping resource and that are capable of being used to carry data, $N_L$ is the quantity of transmission layers of the PUSCH, $Q_m$ is the modulation order of the first UCI, and the third value is $N_L \cdot Q_m \cdot \lceil G^{ACK}/(2 \cdot N_L \cdot Q_m) \rceil$.

The quantity of bits of the HARQ-ACK in the first UCI is not greater than 2.

The foregoing solution is content described in a formula $G^{ACK}(1) \min = (N_L \cdot Q_m \cdot \lceil G^{ACK}/(2 \cdot N_L \cdot Q_m) \rceil, M_3 \cdot N_L \cdot Q_m)$.

Optionally, a quantity of coded bits that are of the HARQ-ACK in the first UCI and that are mapped onto the second frequency hopping resource is $G^{ACK}(2)$, where $G^{ACK}(2) = G^{ACK} - G^{ACK}(1)$.

According to a second aspect, this application further provides a communication method, including: receiving downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is before a time-domain start symbol of the second frequency hopping resource; and sending first UCI on the PUSCH, where the first UCI includes at least one of an HARQ-ACK, CSI-part1, and CSL-part2. A peer device correspondingly performs steps of sending the downlink control information and receiving the first UCI.

A quantity $G^{CSI\text{-}part1}(1)$ of coded bits that are of the CSI-part1 in the first UCI and that are mapped onto the first frequency hopping resource is a smaller one of a fourth value and a fifth value, the fourth value is determined based on a quantity $G^{CSI\text{-}part1}$ of coded bits of the CSI-part1 in the first UCI, and the fifth value is determined based on a larger value in $G^{ACK}(1)$ and $G_{rvd}^{ACK}(1)$, or the fifth value is determined based on $G^{ACK}(1)$, where $G^{ACK}(1)$ is a quantity of coded bits that are of the HARQ-ACK in the first UCI and that are mapped onto the first frequency hopping resource, and $G_{rvd}^{ACK}(1)$ is a quantity of coded bits that can be mapped onto reserved REs in the first frequency hopping resource.

In the prior art, the fifth value is determined based only on $G^{ACK}(1)$. For example, the fifth value is $M_1 \cdot N_L \cdot Q_m - G^{ACK}(1)$ in the prior art, and this parameter sets an upper limit (namely, a first upper limit) for a resource occupied by the CSI-part1 on the first frequency hopping resource. In addition, the CSI-part1 cannot occupy the reserved RE in the first frequency hopping resource. That is, $G^{CSI\text{-}part1}(1)$ should also not be greater than an upper limit $M_1 \cdot N_L \cdot Q_m - G_{rvd}^{ACK}(1)$ (namely, a second upper limit). When the quantity of HARQ-ACK information bits is 0, 1, or 2, $G^{ACK}(1)$ is a quantity of coded bits that is calculated based on an actual quantity of HARQ-ACK information bits, and $G_{rvd}^{ACK}$ is a quantity that is of coded bits mapped onto the reserved RE and that is calculated based on the quantity of HARQ-ACK information bits being 2. Therefore, if the actual quantity of HARQ-ACK information bits is 0 or 1, $G^{ACK} < G^{ACK}$, and $G^{ACK}(1) < G_{rvd}^{ACK}(1)$. That is, on the first frequency hopping resource, $G^{ACK} < G_{rvd}^{ACK}$. In this case, the first upper limit is greater than the second upper limit. In the prior art, if the fifth value is determined based only on $G^{ACK}(1)$, non-reserved RE in the first frequency hopping resource may be insufficient for carrying the quantity $G^{CSI\text{-}part1}(1)$ of coded bits of the CSI-part1 on the first frequency hopping resource.

In the solution provided in this application, the fifth value is determined based on the larger one of $G^{ACK}(1)$ and $G_{rvd}^{ACK}(1)$ (where when the quantity of HARQ-ACK bits is greater than 2, $G_{rvd}^{ACK}(1)$ is equal to 0), to ensure that $G^{CSI\text{-}part1}(1)$ is calculated by using an actual non-reserved RE in the first frequency hopping resource as a reference, thereby avoiding the foregoing problem that the CSI-part1 is incompletely sent.

Optionally, that the fifth value is determined based on a larger value in $G^{ACK}(1)$ and $G_{rvd}^{ACK}(1)$ includes that the fifth value is equal to $M_1 \cdot N_L \cdot Q_m - \max(G^{ACK}(1), G_{rvd}^{ACK}(1))$; or that the fifth value is determined based on $G^{ACK}(1)$ includes: the fifth value is equal to $M_1 \cdot N_L \cdot Q_m - G_{rvd}^{ACK}(1)$ when the quantity of HARQ-ACK bits is greater than 2; or the fifth value is equal to $M_1 \cdot N_L \cdot Q_m - \max(G^{ACK}(1), G_{rvd}^{ACK}(1))$ when the quantity of HARQ-ACK bits is less than or equal to 2.

$M_1$ is a quantity of REs that can carry data and that are in the first frequency hopping resource, $N_L$ is a quantity of transmission layers of the PUSCH, and $Q_m$ is a modulation order of the first UCI.

Optionally, that the fourth value is determined based on a quantity of coded bits of the CSI-part1 in the first UCI includes: the fourth value is equal to $N_L \cdot Q_m \cdot \lceil G^{CSI\text{-}part1}/$ $(2 \cdot N_L \cdot Q_m)]$, where $N_L$ is the quantity of transmission layers of the PUSCH, and $Q_m$ is the modulation order of the first UCI.

The solution provided in the second aspect may be separately implemented, or may be jointly implemented with the solution provided in the first aspect.

According to a third aspect, a communication method is provided, and includes:

receiving indication information, where the indication information is used to schedule a physical uplink shared channel PUSCH, the PUSCH includes a first frequency hopping resource and a second frequency hopping resource, and a time-domain start symbol of the first frequency hopping resource is before a time-domain start symbol of the second frequency hopping resource; and sending first UCI on the PUSCH, where the first UCI includes at least one of a hybrid automatic repeat request-acknowledgment HARQ-ACK, a channel state information part 1 CSI-part1, and a channel state information part 2 CSI-part2, where a quantity of coded bits that can be mapped onto reserved resource elements REs in the first frequency hopping resource is a first value, a quantity of coded bits mapped onto reserved REs in the second frequency hopping resource is a second value, the first value is not less than the second value, and the reserved RE in the first frequency hopping resource and the reserved RE in the second frequency hopping resource are reserved for potential HARQ-ACK transmission in which a bit quantity is not greater than 2.

Optionally, the method may be performed by a terminal device, or may be performed by an apparatus or a chip that is integrated into a terminal device or that is independent from a terminal device.

Correspondingly, this application provides an apparatus, where the apparatus includes:

a receiving unit, configured to receive indication information, where the indication information is used to schedule a physical uplink shared channel PUSCH, the PUSCH includes a first frequency hopping resource and a second frequency hopping resource, and a time-domain start symbol of the first frequency hopping resource is before a time-domain start symbol of the second frequency hopping resource; and a sending unit, configured to send first UCI on the PUSCH, where the first UCI includes at least one of a transmission hybrid automatic repeat request-acknowledgment HARQ-ACK, a channel state information part 1 CSI-part1, and a channel state information part 2 CSI-part2, where a quantity of coded bits that can be mapped onto reserved resource elements REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for potential HARQ-ACK transmission in which a bit quantity is not greater than 2.

In the third aspect, this application further provides another communication method, where the method includes:

sending indication information, where the indication information is used to schedule a physical uplink shared channel PUSCH, and the PUSCH includes a first frequency hopping resource and a second frequency hopping resource; and receiving first UCI on the PUSCH, where the first UCI includes at least one of a transmission hybrid automatic repeat request-acknowledgment HARQ-ACK, a channel state information part 1 CSI-part1, and a channel state information part 2 CSI-part2, where a quantity of coded bits that can be mapped onto reserved resource elements REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for potential HARQ-ACK transmission in which a bit quantity is not greater than 2.

Optionally, the method may be performed by a network device, or may be performed by an apparatus or a chip that is integrated into a network device or that is independent from a network device.

Correspondingly, this application provides an apparatus, where the apparatus includes a sending unit and a receiving unit, to perform corresponding steps in the foregoing method.

In the third aspect, further:

In an optional design, the PUSCH carries an uplink shared channel UL-SCH, the first UCI includes the HARQ-ACK, a quantity of coded bits that are of the HARQ-ACK and that are mapped onto the first frequency hopping resource is a sixth value, and a quantity of coded bits that are of the HARQ-ACK and that are mapped onto the second frequency hopping resource is a seventh value, where the sixth value is not less than the seventh value.

In an optional design, a quantity of mapped coded bits of the HARQ-ACK included in the first UCI is $G^{ACK,withUL-SCH}$; and the sixth value is $G^{ACK,withUL-SCH}(1)$, and $G^{ACK,withUL-SCH}(1)=N_L \cdot Q_m \cdot \lceil G^{ACK,withUL-SCH}/(2 \cdot N_L \cdot Q_m) \rceil$;

and/or the seventh value is $G^{ACK,withUL-SCH}(2)$, and $G^{ACK,withUL-SCH}(2)=N_L \cdot Q_m \cdot \lfloor G^{ACK,withUL-SCH}/(2 \cdot N_L \cdot Q_m) \rfloor$, where $N_L$ is a quantity of transmission layers of the PUSCH, and $Q_m$ is a modulation order of the UL-SCH and the first UCI.

In optional design, the sixth value is $G^{ACK,withUL-SCH}(1)=N_L \cdot Q_m \cdot \lceil G_{rvd}^{ACK,withUL-SCH}/(2 \cdot N_L \cdot Q_m) \rceil$, and the seventh value is $G^{ACK,withUL-SCH}(2)=G^{ACK,withUL-SCH} \ldots G^{ACK,withUL-SCH}(1)$; or the seventh value is $G^{ACK,withUL-SCH}(2)=(2)=N_L \cdot Q_m \cdot \lfloor G^{ACK,withUL-SCH}/(2 \cdot N_L \cdot Q_m) \rfloor$, and the sixth value is $G^{ACK,withUL-SCH}(1)=G^{ACK,withUL-SCH} \ldots G^{ACK,withUL-SCH}(2)$.

According to the solutions provided in the third aspect, when a quantity of HARQ-ACK bits is 2, on the first frequency hopping resource, a quantity of coded bits of the HARQ-ACK is exactly equal to the quantity of coded bits mapped onto the reserved RE, and on the second frequency hopping resource, a quantity of coded bits of the HARQ-ACK is exactly equal to the quantity of coded bits mapped onto the reserved.

According to a fourth aspect, this application provides an apparatus. The apparatus may implement functions corresponding to the steps in the methods in the first aspect, the second aspect, and/or the third aspect. The functions may be implemented by hardware, or may be implemented by hardware executing corresponding software. The hardware or the software includes one or more units or modules corresponding to the foregoing functions.

In a possible design, the apparatus includes a processor, where the processor is configured to support the apparatus in executing the corresponding functions in the method in the foregoing first aspect. The apparatus may further include a memory, where the memory is configured to couple to the processor, and the memory stores program instructions and data that are necessary to the apparatus. Optionally, the apparatus further includes a transceiver, where the transceiver is configured to support communication between the apparatus and another network element. The transceiver may be an independent receiver, an independent transmitter, or a transceiver having transmission and receiving functions.

According to a fifth aspect, this application provides a computer-readable storage medium. The computer-readable storage medium stores computer program code, and when the computer program code is executed by a processing unit or a processor, the methods according to the first aspect, the second aspect, and/or the third aspect are implemented.

According to a sixth aspect, this application provides a computer program product. The computer program product includes computer program code, and when the computer program code is executed by a processing unit or a processor, the methods according to the first aspect, the second aspect, and/or the third aspect are implemented.

According to a seventh aspect, a communication method is provided, and includes: sending downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is before a time-domain start symbol of the second frequency hopping resource; and receiving first UCI on the PUSCH, where the first UCI includes at least one of an HARQ-ACK, CSI-part1, and CSI-part2, where a quantity of coded bits that can be mapped onto reserved REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for transmitting potential HARQ-ACK which has less than or equal to 2 bits.

A reason that information in the CSI-part1 is incompletely sent is that a quantity of coded bits that are of the CSI-part1 and that are mapped onto the second frequency hopping resource is relatively small. In other words, a quantity of REs on the second frequency hopping resource that are used to map the CSI-part1 is relatively small, and consequently, the CSI-part1 cannot be all mapped onto the second frequency hopping resource. Compared with the prior art, this application reduces a quantity of coded bits that are capable of being mapped onto reserved REs in the second frequency hopping resource, thereby increasing a quantity of REs that are in the second frequency hopping resource and that are used to map the CSI-part1. This resolves a problem that due to UCI transmission through frequency hopping in a UCI-only scenario, information in the CSI-para is incompletely sent.

Optionally, the first value is $G_{rvd}^{ACK}(1)$, and $G_{rvd}^{ACK}(1) = N_L \cdot Q_m \cdot \lceil G_{rvd}^{ACK}/2 \cdot N_L \cdot Q_m \rceil$; and/or the second value is $G_{rvd}^{ACK}(2)$, and $G_{rvd}^{ACK}(2) = N_L \cdot Q_m \cdot \lfloor G_{rvd}^{ACK}/(2 \cdot N_L \cdot Q_m) \rfloor$, where $N_L$ is a quantity of transmission layers of the PUSCH, and $Q_m$ is a modulation order of the first UCI.

Optionally, $G_{rvd}^{ACK}(1) = N_L \cdot Q_m \cdot \lceil G_{rvd}^{ACK}/(2 \cdot N_L \cdot Q_m) \rceil$, and $G_{rvd}^{ACK}(2) = G_{rvd}^{ACK} - G_{rvd}^{ACK}(1)$; or $G_{rvd}^{ACK}(2) = N_L \cdot Q_m \cdot \lfloor G_{rvd}^{ACK}/(2 \cdot N_L \cdot Q_m) \rfloor$, and $G_{rvd}^{ACK}(1) = G_{rvd}^{ACK} - G_{rvd}^{ACK}(2)$.

Optionally, a quantity of coded bits that are of the HARQ-ACK in the first UCI and that are mapped onto the first frequency hopping resource is $G^{ACK}(1)$, and a value of $G^{ACK}(1)$ is a smaller one of the following two values:

a quantity of coded bits mapped onto an RE that is after a first group of consecutive DMRS symbols on the first frequency hopping resource and that are capable of being used to carry data, and a third value that is determined based on $G^{ACK}$, where $G^{ACK}$ is a quantity of coded bits of the HARQ-ACK in the first UCI.

Optionally, a value of the quantity of coded bits mapped onto the RE that is after the first group of consecutive DMRS symbols on the first frequency hopping resource and that are capable of being used to carry data is equal to $M_3 \cdot N_L \cdot Q_m$, where $M_3$ is a quantity of REs that are after the first group of consecutive DMRS symbols on the first frequency hopping resource and that are capable of being used to carry data, $N_L$ is the quantity of transmission layers of the PUSCH, $Q_m$ is the modulation order of the first UCI, and the third value is $N_L \cdot Q_m \cdot \lceil G^{ACK}/(2 \cdot N_L \cdot Q_m) \rceil$. The quantity of bits of the HARQ-ACK in the first UCI is not greater than 2.

The foregoing solution is content described in a formula $G^{ACK}(1) = \min(N_L \cdot Q_m \cdot \lceil G^{ACK}/(2 \cdot N_L \cdot Q_m) \rceil, M_3 \cdot N_L \cdot Q_m)$.

Optionally, a quantity of coded bits that are of the HARQ-ACK in the first UCI and that are mapped onto the second frequency hopping resource is $G^{ACK}(2)$, where $G^{ACK}(2) = G^{ACK} - G^{ACK}(1)$.

According to a eighth aspect, this application further provides a communication method, including: sending downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is before a time-domain start symbol of the second frequency hopping resource; and receiving first UCI on the PUSCH, where the first UCI includes at least one of an HARQ-ACK, CSI-part1, and CSI-part2.

A quantity $G^{CSI\text{-}part1}(1)$ of coded bits that are of the CSI-part1 in the first UCI and that are mapped onto the first frequency hopping resource is a smaller one of a fourth value and a fifth value, the fourth value is determined based on a quantity $G^{CSI\text{-}part1}$ of coded bits of the CSI-part1 in the first UCI, and the fifth value is determined based on a larger value in $G^{ACK}(1)$ and $G_{rvd}^{ACK}(1)$ or the fifth value is determined based on $G^{ACK}(1)$, where $G^{ACK}(1)$ is a quantity of coded bits that are of the HARQ-ACK in the first UCI and that are mapped onto the first frequency hopping resource, and $G_{rvd}^{ACK}(1)$ is a quantity of coded bits that can be mapped onto reserved REs in the first frequency hopping resource.

In the prior art, the fifth value is determined based only on $G^{ACK}(1)$. For example, the fifth value is $M_1 \cdot N_L \cdot Q_m - G^{ACK}(1)$ in the prior art, and this parameter sets an upper limit (namely, a first upper limit) for a resource occupied by the CSI-part1 on the first frequency hopping resource. In addition, the CSI-part1 cannot occupy the reserved RE in the first frequency hopping resource. That is, $G^{CSI\text{-}part1}(1)$ should also not be greater than an upper limit $M_1 \cdot N_L \cdot Q_m - G_{rvd}^{ACK}(1)$ (namely, a second upper limit). When a quantity of HARQ-ACK information bits is 0, 1, or 2, $G^{ACK}(1)$ is a quantity of coded bits that is calculated based on an actual quantity of HARQ-ACK information bits, and $G_{rvd}^{ACK}$ is a quantity that is of coded bits mapped onto the reserved RE and that is calculated based on the quantity of HARQ-ACK information bits being 2. Therefore, if the actual quantity of HARQ-ACK information bits is 0 or 1, $G^{ACK} < G_{rvd}^{ACK}$, and $G^{ACK}(1) < G_{rvd}^{ACK}(1)$. That is, on the first frequency hopping resource, $G^{ACK} < G_{rvd}^{ACK}$. In this case, the first upper limit is greater than the second upper limit. In the prior art, if the fifth value is determined based only on $G^{ACK}(1)$, a non-reserved RE in the first frequency hopping resource may be insufficient for carrying the quantity $G^{CSI-part1}(1)$ of coded bits of the CSI-part1 on the first frequency hopping resource.

In the solution provided in this application, the fifth value is determined based on the larger one of $G^{ACK}(1)$ and $G_{rvd}^{ACK}(1)$ (where when the quantity of HARQ-ACK bits is greater than 2, (1) is equal to 0), to ensure that $G^{CSI-part1}(1)$ is calculated by using an actual non-reserved RE in the first frequency hopping resource as a reference, thereby avoiding the foregoing problem that the CSI-part1 is incompletely sent.

Optionally, that the fifth value is determined based on a larger value in $G^{ACK}(1)$ and $G_{rvd}^{ACK}(1)$ includes that the fifth value is equal to $M_1 \cdot N_L \cdot Q_m - \max(G^{ACK}(1), G_{rvd}^{ACK}(1))$; or that the fifth value is determined based on $G^{ACK}(1)$ includes that the fifth value is equal to $M_1 \cdot N_L \cdot Q_m - G^{ACK}(1)$ when the quantity of HARQ-ACK bits is greater than 2.

$M_1$ is a quantity of REs that can carry data and that are in the first frequency hopping resource, $N_L$ is a quantity of transmission layers of the PUSCH, and $Q_m$ is a modulation order of the first UCI.

Optionally, that the fourth value is determined based on a quantity of coded bits of the CSI-part) in the first UCI includes: the fourth value is equal to $N_L \cdot Q_m \cdot \lceil G^{CSI-part1}/(2 \cdot N_L \cdot Q_m) \rceil$, where $N_L$ is the quantity of transmission layers of the PUSCH, and $Q_m$ is the modulation order of the first UCI.

BRIEF DESCRIPTION OF DRAWINGS

FIG. 3 is a schematic diagram of another UCI mapping scheme in a UCI-only scenario according to this application;

FIG. 4 is a schematic diagram of a communication method according to this application;

FIG. 7 is a schematic diagram of still another communication method according to this application;

FIG. 8 is a schematic diagram of still another communication method according to this application;

DESCRIPTION OF EMBODIMENTS

The following describes technical solutions of this application with reference to accompanying drawings.

Figure 1:
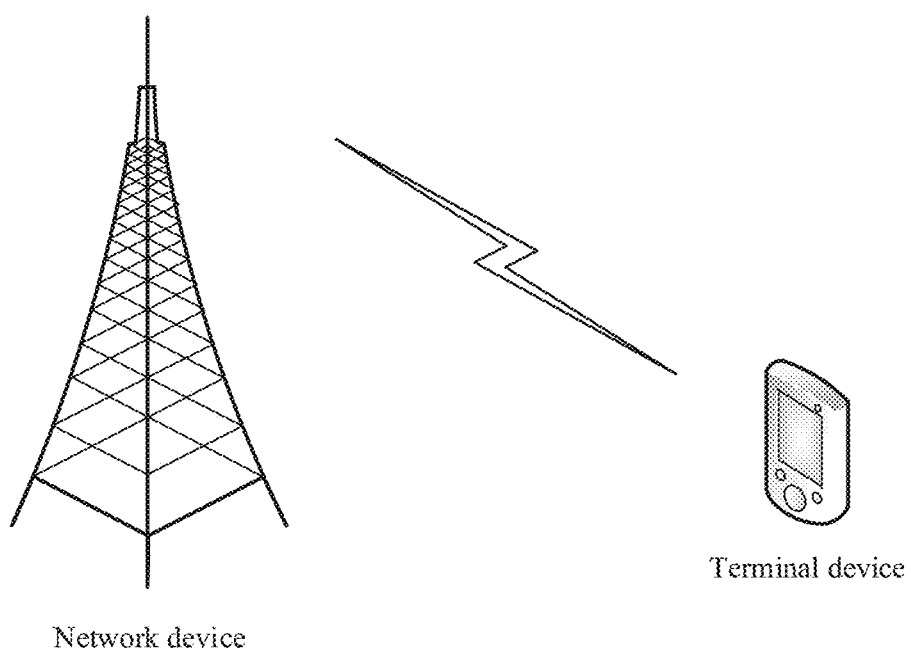
FIG. 1 is a schematic diagram of a communications system to which this application is applicable.

FIG. 1 shows a communications system to which this application is applicable. The communications system includes a network device and a terminal device. The network device communicates with the terminal device via a wireless network. When the terminal device sends information, a wireless communications module of the terminal device may obtain information bits that are to be sent to the network device over a channel. For example, the information bits are generated by a processing module of the terminal device, received from another device, or stored in a storage module of the terminal device.

In this application, the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a handheld device having a wireless communication function, a computing device, another processing device connected to a wireless modem, a vehicle-mounted device, a wearable device, or user equipment in a 5G communications system.

The network device may be a base transceiver station (BTS) in a code division multiple access (CDMA) system, a NodeB (NB) in a wideband code division multiple access (WCDMA) system, an evolved NodeB (eNB) in a long term evolution (long term evolution, LTE) system, or a gNB in a 5G communications system. The foregoing base stations are only used as examples for illustration. Alternatively, the network device may be a relay node, an access point, a vehicle-mounted device, a wearable device, or another type of device.

The foregoing communications systems to which this application is applicable are merely examples for description, and a communications system to which this application is applicable is not limited thereto. For example, the communications system may include another quantity of network devices and another quantity of terminal devices.

To facilitate understanding of the technical solutions in this application, concepts used in this application are first briefly described. A 5G system is used as an example for description.

In a scenario in which UE sends UCI to a gNB on a PUSCH, the UE may miss detecting a physical downlink control channel (PDCCH), Consequently, a cognitive error occurs on a quantity of HARQ-ACK bits that need to be fed back, that is, a quantity of HARQ-ACK bits actually fed back by the UE is less than a quantity of HARQ-ACK bits that the gNB schedules the UE to feed back. Further, all UCI sent by the UE on the PUSCH may not be correctly received by the gNB. To avoid impact, on CSI-part1, of a decrease in HARQ-ACKs sent by the UE, in a communication protocol, reserved REs for an HARQ-ACK. (reserved RE for HARQ-ACK) namely, a reserved RE, is defined for the scenario in which the UE sends the UCI to the gNB on the PUSCH. The specific definition is as follows:

(1) When a quantity of HARQ-ACK information bits is 0, 1, or 2, the reserved RE is generated based on the quantity of HARQ-ACK information bits being 2.

(2) Because CSI-part1 having a relatively high protection level requirement cannot be sent on the reserved RE, when the quantity of HARQ-ACK information bits is not greater than 2, missing transmission of an HARQ-ACK does not affect the CSI-part1.

(3) CSI-part2 and a UL-SCH may be sent on the reserved RE (where in a UCI-only scenario, only the CSI-part2 may be sent).

(4) If there are HARQ-ACK information bits that need to be transmitted (that is, the quantity of HARQ-ACK information bits is 1 or 2), an HARQ-ACK is transmitted on the reserved RE. In other words, the reserved RE onto which the CSI-part2 that has been mapped is punctured for the HARQ-ACK in this case.

To obtain a frequency hopping gain, the PUSCH may be divided into two parts in time domain, where the two parts are respectively referred to as a first hop (hop 1) and a second hop (hop 2). Frequency domain resources on the hop 1 and the hop 2 are different. Correspondingly, the HARQ-ACK, the CSI-part1, and the CSI-part2 are also mapped to the hop 1 and the hop 2 according to a preset rule.

Figure 2:
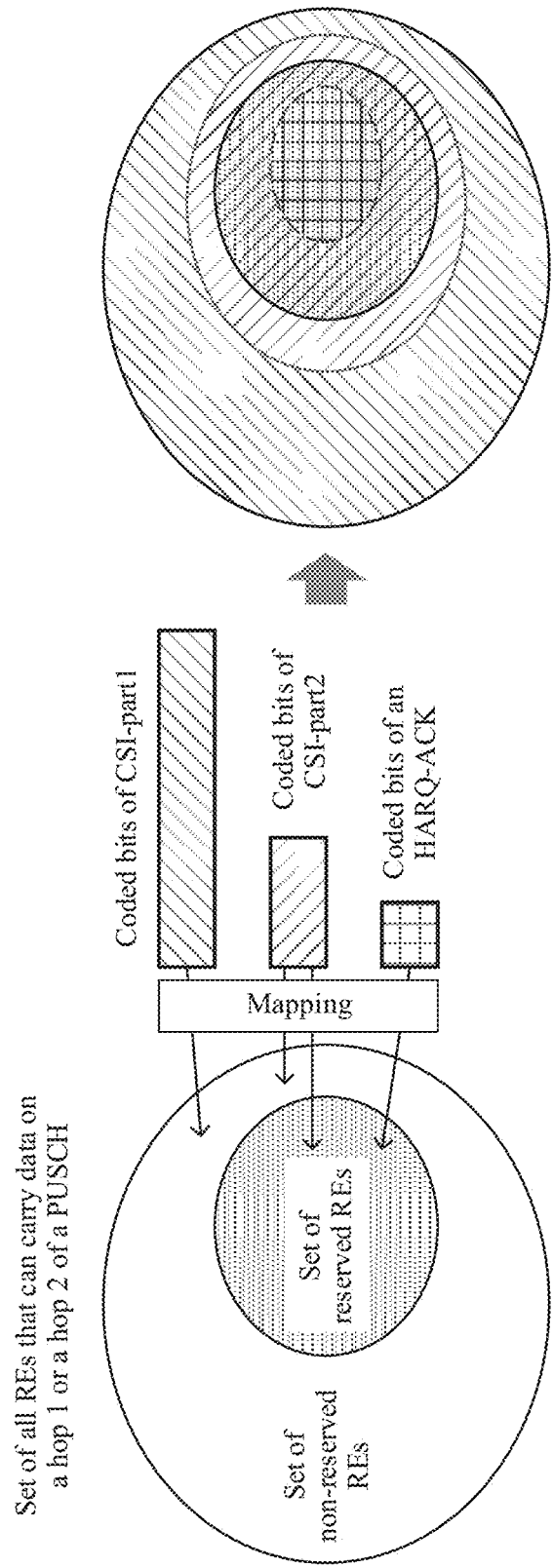
FIG. 2 is a schematic diagram of a UCI mapping scheme in a UCI-only scenario according to this application.

The foregoing mapping rule may be intuitively represented in FIG. 2. As shown in FIG. 2, the CSI-part1 is mapped only onto a non-reserved RE, and the CSI-part2 has both a part mapped onto reserved REs and a part mapped onto a non-reserved RE. If there is an HARQ-ACK (that is, a quantity of information bits is 1 or 2), the HARQ-ACK is mapped onto reserved REs (in other words, a resource onto which a coded bit of the CSI-part2 has been mapped is punctured).

The following rules apply to PUSCH frequency hopping:

A frequency hopping rule for a quantity of PUSCH symbols includes intra-slot (slot) frequency hopping and inter-slot frequency hopping. Details are as follows:

For the intra-slot frequency hopping, a quantity of symbols on the hop 1 is rounding half of a total quantity of PUSCH symbols down to a nearest integer, namely, $\lfloor N_{symb}^{PUSCH,s}/2 \rfloor$; and a quantity of symbols on the hop 2 is equal to the total quantity of PUSCH symbols minus the quantity of symbols on the hop 1, namely, $N_{symb}^{PUSCH,s} - \lfloor N_{symb}^{PUSCH,s}/2 \rfloor$. $N_{symb}^{PUSCH,s}$ is a total quantity of PUSCH symbols in one slot.

For the inter-slot frequency hopping, the hop 1 and the hop 2 are obtained through division by slot in terms of time. For example, a hop with an even slot number is the hop 1, and a hop with an odd slot number is the hop 2.

Depending on a demodulation reference signal (demodulation reference signal, DMRS) pattern in a case of PUTSCH frequency hopping specified in a current protocol, a possible case of the intra-slot frequency hopping includes: a quantity of symbols that can carry data on the hop 1 is equal to a quantity of symbols that can carry data on the hop 2; or a quantity of symbols that can carry data on the hop 1 is less than a quantity of symbols that can carry data on the hop 2 by 1; and in the case of the inter-slot frequency hopping, a quantity of symbols that can carry data on the hop 1 is equal to a quantity of symbols that can carry data on the hop 2.

A frequency hopping splitting rule for a quantity of coded bits mapped onto the reserved RE is as follows:

Assuming that the quantity of coded bits mapped onto the reserved RE is $G_{rvd}^{ACK}$, quantities of coded bits mapped onto reserved REs on the hop 1 and the hop 2 are respectively:

$$G_{rvd}^{ACK}(1) = N_L \cdot Q_m \cdot \lfloor G_{rvd}^{ACK}/(2 \cdot N_L \cdot Q_m) \rfloor \quad (1)$$

$$G_{rvd}^{ACK}(2) = N_L \cdot Q_m \cdot \lceil G_{rvd}^{ACK}/(2 \cdot N_L \cdot Q_m) \rceil \quad (2)$$

where $N_L$ is a quantity of transmission layers of the PUSCH, and $Q_m$ is a modulation order of the PUSCH. It can be learned from the formula (1) and the formula (2) that, $$G_{rvd}^{ACK}(1) \leq G_{rvd}^{ACK}/2 \quad (3)$$

$$G_{rvd}^{ACK}(2) \leq G_{rvd}^{ACK}/2 \quad (4)$$

The equals signs in the formula (3) and the formula (4) are valid only when $G_{rvd}^{ACK}$ can be exactly divided by $(2 \cdot N_L \cdot Q_m)$.

According to an existing specification, in the UCI-only scenario, quantities of coded bits of the parts (the HARQ-ACK, the CSI-part1, and the CSI-part2) of the UCI are also obtained through splitting according to a specific rule during frequency hopping. The following three parameters are defined before the splitting is described:

Quantity of REs that can carry data on the hop 1:

$$M_1 = \sum_{l=0}^{N_{symb,hop}^{PUSCH}(1)-1} M_{SC}^{UCI}(l).$$

$N_{symb,hop}^{PUSCH}(1)$ is a quantity of symbols on the hop 1, $M_{SC}^{UCI}(l)$ is a size of a set $\Phi_l^{UCI}$, and the set $\Phi_l^{UCI}$ is a quantity of REs that can carry data on a symbol l.

Quantity of REs that can carry data on the hop 2:

$$M_2 = \sum_{l=N_{symb,hop}^{PUSCH}(1)}^{N_{symb,hop}^{PUSCH}(1)+N_{symb,hop}^{PUSCH}(2)-1} M_{SC}^{UCI}(l).$$

$N_{symb,hop}^{PUSCH}(2)$ is a quantity of symbols on the hop 2.

Quantity of REs that can carry data on a PUSCH symbol after a first group of consecutive DMRS symbols on the hop 1 of the PUSCH:

$$M_3 = \sum_{l=i^{(1)}}^{N_{symb,hop}^{PUSCH}(1)-1} M_{SC}^{UCI}(l) \cdot l^{(1)}$$

is defined as an index of the first symbol that does not include a DMRS and that is after the first group of consecutive DMRS symbols. A group of consecutive DMRS symbols may include one DMRS symbol, or may include a plurality of consecutive DMRS symbols.

Frequency hopping splitting rules for the quantities of coded bits of the parts (the HARQ-ACK, the CSI-part1, and the CSI-part2) of the UCI are as follows:

Frequency hopping splitting rule for the quantity of coded bits of the HARQ-ACK:

Assuming that the quantity of coded bits of the HARQ-ACK is $G^{ACK}$, quantities of coded bits of the HARQ-ACK that are sent on the hop 1 and the hop 2 are respectively:

$G^{ACK}(1) = \min(N_L \cdot Q_m \cdot \lfloor G^{ACK}/(2 \cdot N_L \cdot Q_m) \rfloor, \quad M_3 \cdot N_L \cdot Q_m);$ and $G^{ACK}(2) = G^{ACK} - G^{ACK}(1).$ Frequency hopping splitting rule fix the quantity of coded bits of the CSI-part1:

Assuming that the quantity of coded bits of the CSI-part1 is $G^{CSI-part1}$, quantities of coded bits of the CSI-part1 that are sent on the hop 1 and the hop 2 are respectively:

$$G^{CSI-part1}(1) = \min(N_L \cdot Q_m \cdot \lfloor G^{CSI-part1}/(2 \cdot N_L \cdot Q_m) \rfloor, M_1 \cdot N_L \cdot Q_{m'} \ldots G^{ACK}(1)) \quad (5)$$

$$G^{CSI-part1}(2) = G^{CSI-part1} - G^{CSI-part1}(1) \quad (6)$$

When a minimum operation $\min(\cdot, \cdot)$ in the formula (5) is performed on the left of the comma, the following can be learned by combining the formulas (5) and (6):

$$G^{CSI-part1}(1) \leq G^{CSI-part1}(2) \quad (7)$$

The equals sign is valid only when $G^{CSI-part1}$ can be exactly divided by $(2 \cdot N_L \cdot Q_m)$.

Frequency hopping splitting rule for the quantity of coded bits of the CSI-part2:

Assuming that the quantity of coded bits of the CSI-part2 is $G^{CSI-part2}$, quantities of coded bits of the CSI-part2 that are sent on the hop 1 and the hop 2 are respectively:

$$G^{CSI-part2}(1) = M_1 \cdot N_L \cdot Q_m - G^{CSI-part1}(1) \quad (8)$$

$$G^{CSI-part2}(2) = M_2 \cdot N_L \cdot Q_m - G^{CSI-part1}(2) \quad (9)$$

When the following three conditions exist in the UCI-only scenario, the CSI-part1 is incompletely sent.

Condition 1: The quantity of coded bits of the CSI-part1 is exactly equal to a quantity of coded bits mapped onto all REs that can carry data other than the reserved REs on the hop 1 and the hop 2 of the PUSCH, that is:

$$G^{CSI-part1} = (M_1 + M_2) \cdot N_L \cdot Q_m - G_{rvd}^{ACK} \quad (10)$$

Condition 2: $G^{CSI-part1}$ cannot be exactly divided by $(2 \cdot N_L \cdot Q_m)$. Therefore, the equals sign is invalid in the formula (7), that is:

$$G^{CSI-part1}(1) < G^{CSI-part1}(2) \quad (11)$$

Condition 3: Quantities of REs that are capable of being used to carry data and that are of two frequency hopping resources are the same, that is, for the hop 1 and the hop 2 of the PUSCH, $M_1 = M_2$ (12).

The following can be learned from the formulas (8), (9), (11), and (12):

$$G^{CSI-part2}(1) > G^{CSI-part2}(2) \quad (13)$$

The following can be obtained by adding the formulas (8) and (9):

$$G^{CSI-part2}(1) + G^{CSI-part2}(2) = (M_1 + M_2) \cdot N_L \cdot Q_m - G^{CSI-part1} \quad (14)$$

The following can be obtained from the formulas (14) and (10):

$$G^{CSI-part2}(1) + G^{CSI-part2}(2) = G_{rvd}^{ACK} \quad (15)$$

The following can be obtained from the formulas (13) and (15):

$$G^{CSI-part2}(2) < G_{rvd}^{ACK}/2 \quad (16)$$

The following can be obtained from the formulas (16) and (4):

$$G^{CSI-part2}(2) < G_{rvd}^{ACK}(2) \quad (17)$$

Therefore, the following can be learned from the formulas (9) and (17):

$$G^{CSI-part2}(2) = M_2 \cdot N_L \cdot Q_m - G^{CSI-part2}(2) > M_2 \cdot N_L \cdot Q_m - G_{rvd}^{ACK}(2)$$

That is, the quantity of coded bits of the CSI-part1 on the hop 2 is greater than a quantity of coded bits mapped onto a non-reserved RE, and the CSI-part1 cannot be carried by using a reserved RE. Therefore, the CSI-part1 is incompletely sent.

In addition, due to $G^{CSI-part2}(2) < G_{rvd}^{ACK}(2)$ (formula (17)), there may Be reserved REs on which no data is sent, as shown in FIG. 3. If the PUSCH uses a single-carrier discrete Fourier transform spread orthogonal frequency division multiplexing (discrete Fourier transform spread orthogonal frequency division multiplexing, DFT-s-OFDM), the foregoing RE on which no data is sent may damage a single-carrier low peak-to-average power ratio (peak-to-average power ratio, PAPR) characteristic for uplink transmission on one or more symbols on the hop 2.

In addition, the symbol used in this application is a time unit, and may be an orthogonal frequency-division multiplexing (orthogonal frequency-division multiplexing, OFDM) symbol.

In view of this, this application provides a communication method, to resolve a problem that the CSI-part1 is incompletely sent, and further to resolve a problem that a single-carder characteristic is damaged when a signal is sent on the hop 2 by sing the DFT-s-OFDM waveform.

As shown in FIG. 4, the communication method includes the following steps.

S410. Receive downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is before a time-domain start symbol of the second frequency hopping resource.

That the PUSCH is used to carry only UCI refers to a UCI-only scenario defined in a communication protocol. The first frequency hopping resource and the second frequency hopping resource are, for example, the hop 1 and the hop 2 described above. Optionally, a frequency domain resource of the first frequency hopping resource is different from a frequency domain resource of the second frequency hopping resource, and the difference means that the frequency domain resource of the first frequency hopping resource partially overlaps or does not overlap the frequency domain resource of the second frequency hopping resource. Further, optionally, a time-domain end position of the first frequency hopping resource is adjacent to a time-domain start position of the second frequency hopping resource. Alternatively, the first frequency hopping resource is consecutive or inconsecutive in time domain, and the second frequency hopping resource is consecutive or inconsecutive in time domain. The explanation of the frequency hopping resource may be applied to another method or implementation in this application.

The downlink control information described in S410 is, for example, downlink control information (DCI) transmitted on a PDCCH. A base station may indicate, by using different states of one bit in the DCI, whether the PUSCH is used to transmit only the UCI. In other words, whether a current communication scenario is the UCI-only scenario is indicated by using the different states of the bit.

S420. Send first UCI on the PUSCH, where the first UCI includes at least one of an HARQ-ACK, CSI-part1, and CSI-part2.

A quantity of coded bits that can be mapped onto reserved REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for transmitting potential HARQ-ACK which has less than or equal to 2 bits. Herein, the "potential HARQ-ACK transmission" is further explained. In this embodiment of this application, the HARQ-ACK may be transmitted on the PUSCH, or may not be actually transmitted. Regardless of whether the HARQ-ACK is transmitted, these REs are to be reserved. These to-be-reserved REs correspond to a specific quantity of coded bits to be mapped onto the REs. Specifically, the quantity of HARQ-ACK bits used in the "potential HARQ-ACK transmission" is not greater than 2. In addition, the quantity of coded bits mapped onto the reserved RE is specifically calculated based on the quantity of HARQ-ACK bits being equal to 2. In this embodiment of this application, if there is no actual transmission, the quantity of coded bits mapped onto the reserved RE may be understood as a quantity of coded bits that are capable of being mapped to the reserved RE, or a corresponding quantity of coded bits corresponding to the reserved RE.

A reason that information in the CSI-part1 is incompletely sent is that a quantity of coded bits that are of the CSI-part1 and that are mapped onto the second frequency hopping resource is relatively small. In other words, a quantity of REs on the second frequency hopping resource that are used to map the CSI-part1 is relatively small, and consequently, the CSI-part cannot be all mapped onto the second frequency hopping resource. Compared with the prior art, this application reduces a quantity of coded bits that are capable of being mapped onto reserved REs in the second frequency hopping resource, thereby increasing a quantity of REs that are in the second frequency hopping resource and that are used to map the CSI-part1. This resolves a problem that due to UCI transmission through frequency hopping in a UCI-only scenario, information in the CSI-part1 is incompletely sent.

In addition, in the foregoing solution, a quantity of reserved REs in the second frequency hopping resource is reduced, and a case in which no data is sent on the RE in the second frequency hopping resource is avoided, Therefore, in the method 400, the problem that the CSI-part1 is incompletely sent is resolved, and the problem shown in FIG. 3 is also resolved.

It should be noted that "a quantity of coded bits that can be mapped onto reserved REs in the first frequency hopping resource is a first value, a quantity of coded bits that can be mapped onto reserved REs in the second frequency hopping resource is a second value, and the first value is not less than the second value" means that the quantity of reserved REs in the second frequency hopping resource is reduced, so that the second value is greater than or equal to the first value.

Optionally, the method 400 further includes:

determining a first quantity $G_{rvd}^{ACK}$ of coded bits, where $G_{rvd}^{ACK}$ is a sum of the quantities of coded bits that are capable of being mapped onto the reserved REs in the first frequency hopping resource and the second frequency hopping resource, and both the first value and the second value are determined based on $G_{rvd}^{ACK}$.

Specifically, the "sum of the quantities of coded bits mapped onto the reserved REs in the first frequency hopping resource and the second frequency hopping resource" refers to a sum of a quantity of coded bits that are capable of being mapped onto the reserved RE in the first frequency hopping resource and a quantity of coded bits that are capable of being mapped onto the reserved RE in the second frequency hopping resource, but should not be understood as a sum of a quantity of coded bits actually mapped onto the reserved RE in the first frequency hopping resource and a quantity of coded bits actually mapped onto the reserved RE in the second frequency hopping resource.

Optionally, the first value is $G_{rvd}^{ACK}(1)$, and $G_{rvd}^{ACK}(1)= N_L \cdot Q_m \cdot \lceil G_{rvd}^{ACK}/(2 \cdot N_L \cdot Q_m) \rceil$); and/or the second value is $G_{rvd}^{ACK}(2)$, and $G_{rvd}^{ACK}(2)=N_L \cdot Q_m \cdot \lfloor G_{rvd}^{ACK}/(2 \cdot N_L \cdot Q_m) \rfloor$), where $N_L$ is a quantity of transmission layers of the PUSCH, and), is a modulation order of the first UCI, namely, a modulation order of the UCI transmitted on the PUSCH.

$G_{rvd}^{ACK}(2)$ is obtained by performing a rounding down operation on $G_{rvd}^{ACK}/(2 \cdot N_L \cdot Q_m)$, and/or $G_{rvd}^{ACK}(2)$ is obtained by performing a rounding up operation on $G_{rvd}^{ACK}/(2 \cdot N_L \cdot Q_m)$, so that the quantity of coded bits (namely, a quantity of reserved REs) mapped onto the reserved RE in the second frequency hopping resource is less than or equal to the quantity of coded bits (namely, a quantity of reserved REs) mapped onto the reserved RE in the first frequency hopping resource.

Optionally, $G_{rvd}^{ACK}(1)=N_L \cdot Q_m \cdot \lceil G_{rvd}^{ACK}/(2 \cdot N_L \cdot Q_m) \rceil$), and $G_{rvd}^{ACK}(2)=G_{rvd}^{ACK}-G_{rvd}^{ACK}(1)$; or
$G_{rvd}^{ACK}(2)=N_L \cdot Q_m \cdot \lfloor G_{rvd}^{ACK}/(2 \cdot N_L \cdot Q_m) \rfloor$), and $G_{rvd}^{ACK}(1)=G_{rvd}^{ACK}-G_{rvd}^{ACK}(2)$.

Optionally, the method 400 further includes:

determining a quantity $G^{ACK}$ of coded bits of the HARQ-ACK in the first UCI, where a quantity of coded bits that are of the HARQ-ACK in the first UCI and that are mapped onto the first frequency hopping resource is $G^{ACK}(1)$, and a value of $G^{ACK}(1)$ is a smaller one of the following two values:

a quantity of coded bits mapped onto an RE that is after a first group of consecutive DMRS symbols on the first frequency hopping resource and that are capable of being used to carry data, and a third value that is determined based on $G^{ACK}$.

The foregoing description may be expressed by using the following formula:

$$G^{ACK}(1)=\min(N_L \cdot Q_m \cdot \lceil G^{ACK}/(2 \cdot N_L \cdot Q_m) \rceil), M_3 \cdot N_L \cdot Q_m).$$

$N_L \cdot Q_m \cdot \lceil G^{ACK}/(2 \cdot N_L \cdot Q_m) \rceil$ represents the third value, and $M_3 \cdot N_L \cdot Q_m$ represents the quantity of coded bits mapped onto the RE that is after the first group of consecutive DMRS symbols on the first frequency hopping resource and that are capable of being used to carry data, and the DMRS symbol is a symbol used to carry a DMRS, $M_3$ is a quantity of REs that are after the first group of consecutive DMRS symbols on the first frequency hopping resource and that are capable of being used to carry data, $N_L$ is the quantity of transmission layers of the PUSCH, and $Q_m$ is the modulation order of the first UCI. There may be one or more symbols in the first group of consecutive DMRS symbols.

Figures 5, 6:
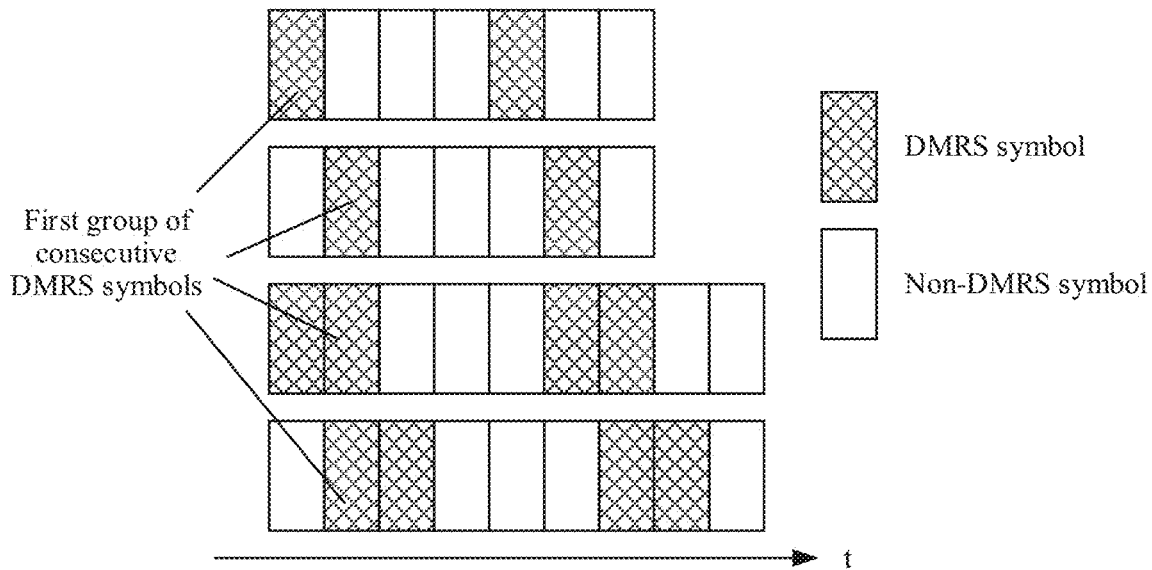
FIG. 5 is a schematic diagram of PUSCH resource allocation according to this application.
FIG. 6 is a schematic diagram of another communication method according to this application.

In this application, it should be noted that the first group of consecutive DMRS symbols start from the first DMRS symbol on a corresponding resource in time domain, and ends with the last consecutive DMRS symbol. For details, refer to FIG. 5. In FIG. 5, four PUSCH resources, namely, a PUSCH 1, a PUSCH 2, a PUSCH 3, and a PUSCH 4 are shown from top to bottom (the top-to-bottom sequence is used only to logically distinguish between the four PUSCH resources, and imposes no limitation on a frequency-domain position relationship). Start symbols of the PUTSCH 1 and the PUSCH 3 are DMRS symbols, and start symbols of the PUTSCH 2 and the PUSCH 4 are not DMRS symbols. In addition, the first group of consecutive DMRS symbols in each of the PUSCH 1 and the PUSCH 2 include only one symbol, and the first group of consecutive DMRS symbols in each of the PUSCH 3 and the PUSCH 4 include a plurality of symbols.

Optionally, a quantity of coded bits that are of the HARQ-ACK in the first UCI and that are mapped onto the second frequency hopping resource is $G^{ACK}(2)$, where $G^{ACK}(2)=G^{ACK}-G^{ACK}(1)$.

For explanations of related terms in this application, refer to definitions in a communication protocol (section 6.2.7 in 3GPP TS38.212 v15.2.0).

The following further provides an example of frequency hopping transmission provided in this application.

Step 1: A gNB configures parameters such as a scale parameter α and a code rate compensation parameter ($\beta_{offset}^{HARQ-ACK}$, $\beta_{offset}^{CSI-1}$, and $\beta_{offset}^{CSI-2}$) for the UE, by using RRC signaling, where a value of the scale parameter α is greater than 0 and less than or equal to 1, and one or more groups of values may be configured for the code rate compensation parameter. If one group of values are configured, the group of values are directly used in a subsequent step. If a plurality of groups of values are configured, downlink control information (downlink control information, DCI) in step 2 may be used to indicate indexes of the groups of values.

Step 2: The gNB sends DCI to the UE on a PDCCH, where the DCI includes but is not limited to the following information: a PUSCH resource allocated to the UE, whether the PUSCH is UCI-only (or whether the PUSCH includes a UL-SCH), whether frequency hopping is performed for the PUSCH, and parameters such as a modulation and coding scheme index ($I_{MCS}$), the quantity $N_L$ of transmission layers of the PUSCH, and indexes (optional) of $\beta_{offset}^{HARQ-ACK}$, $\beta_{offset}^{CSI-1}$, and $\beta_{offset}^{CSI-2}$.

Step 3: After receiving the DCI, the UE parses the DCI to obtain the PUSCH resource allocated to the UE, whether the PUSCH is UCI-only, whether frequency hopping is performed for the PUSCH, and the parameters such as bacs and the quantity $N_L$ of transmission layers of the PUSCH. The UE obtains a code rate R and the modulation order $Q_m$ through table lookup by using $I_{MCS}$. If the DCI includes the indexes of ($\beta_{offset}^{HARQ-ACK}$, $\beta_{offset}^{CSI-1}$, and $\beta_{offset}^{CSI-2}$, the UE obtains, through parsing, values of ($\beta_{offset}^{HARQ-ACK}$, $\beta_{offset}^{CSI-1}$, and $\beta_{offset}^{CSI-2}$ based on the indexes, and uses the values in a subsequent step.

Step 4: If the UE obtains, through parsing, that the PUSCH is UCI-only, and a quantity of HARQ-ACK information bits that need to be sent by the UE is not greater than 2 (that is, the quantity of HARQ-ACK information bits is 0, 1, or 2), the UE calculates, according to the following formula (in the following formula, 2 on the numerator indicates that calculation is performed based on the quantity of HARQ-ACK information bits being 2), a quantity of reserved REs reserved for an HARQ-ACK:

$$Q'_{ACK} = \min\left\{\left\lceil \frac{2 \cdot \beta_{offset}^{HARQ-ACK}}{R \cdot Q_m}\right\rceil, \left\lceil \alpha \cdot \sum_{l=l_0}^{N_{symb,all}^{PUSCH}-1} M_{SC}^{UCI}(l)\right\rceil\right\}$$

$M_{sc}^{UCI}(l)$ is a quantity of REs that can carry UCI on a symbol l on the PUSCH, $l_0$ is an index of the first DMRS symbol of the PUSCH or is an index of the first symbol that does not include a DMRS and that is after a first group of consecutive multiple DMRS, and $N_{symb,all}^{PUSCH}$ is a quantity of symbols of the PUSCH.

Then, a quantity $G_{rvd}^{ACK}$ of coded bits mapped onto the reserved REs that may need to be reserved for the HARQ-ACK is calculated based on obtained $Q'_{ACK}$.

In addition, the UE calculates a quantity $G^{ACK}$ coded bits of the HARQ-ACK, a quantity $G^{CSI-part1}$ of coded bits of the CSI-part1, and a quantity of coded bits of the CSI-part2 based on the parameters such as α, ($\beta_{offset}^{HARQ-ACK}$, $\beta_{offset}^{CSI-1}$, and $\beta_{offset}^{CSI-2}$, R, $Q_m$, and $N_L$.

Step 5: If the UE needs to perform frequency hopping to parse the PUSCH, the UE calculates a quantity of coded bits of the HARQ-ACK, a quantity of coded bits of the CSI-part1, and a quantity of coded bits of the CSI-part2 respectively on the hop 1 and the hop 2 according to the following formulas:

$$G^{ACK}(1) = \min(N_L \cdot Q_m \cdot \lfloor G^{ACK}/(2 \cdot N_L \cdot Q_m)\rfloor, M_3 \cdot N_L \cdot Q_m);$$

or $$G^{ACK}(1) = \min(N_L \cdot Q_m \cdot \lceil G^{ACK}/(2 \cdot N_L \cdot Q_m)\rceil, M_3 \cdot N_L \cdot Q_m);$$

$$G^{ACK}(2) = G^{ACK} - G^{ACK}(1);$$

$$G^{CSI-part1}(1) = \min(N_L \cdot Q_m \cdot \lfloor G^{CSI-part1}/(2 \cdot N_L \cdot Q_m)\rfloor, M_1 \cdot N_L \cdot Q_m), M_1 \cdot N_L \cdot Q_m - \max(G^{ACK}(1),$$

$$G^{CSI-part1}(2) = G^{CSI-part1} - G^{CSI-part1}(1);$$

$$G^{CSI-part1}(1) = M_1 \cdot N_L \cdot Q_m - G^{CSI-part1}(1); \text{ and}$$

$$G^{CSI-part1}(2) = M_2 \cdot N_L \cdot Q_m - G^{CSI-part1}(2).$$

The UE calculates the quantities of coded bits mapped onto the reserved REs that are reserved for the HARQ-ACK on the hop 1 and the hop 2 according to the following formulas:

$$G_{rvd}^{ACK}(1) = N_L \cdot Q_m \cdot \lceil G_{rvd}^{ACK}/(2 \cdot N_L \cdot Q_m)\rceil; \text{ and}$$

$$G_{rvd}^{ACK}(2) = N_L \cdot Q_m \cdot \lfloor G_{rvd}^{ACK}/(2 \cdot N_L \cdot Q_m)\rfloor.$$

Step 6: The UE maps the coded bits of the HARQ-ACK, the CSI-part1, and the CSI-part2 onto the PUSCH based on the parameters calculated in step 5.

The following uses several examples to describe beneficial effects brought by calculating, by using the communication method (for example, frequency hopping transmission is performed by using $G_{rvd}^{ACK}(1) = N_L \cdot Q_m \cdot \lceil G_{rvd}^{ACK}/(2 \cdot N_L \cdot Q_m)\rceil$ and $G_{rvd}^{ACK}(2) = N_L \cdot Q_m \cdot \lfloor G_{rvd}^{ACK}/(2 \cdot N_L \cdot Q_m)\rfloor$) provided in this application, the quantities of coded bits mapped onto the two hops. Table 1 is a result obtained by using a method in the prior art, and Table 2 is a result obtained by using the method in this application.

TABLE 1

| | | | Incorrect example value | | |
| --- | --- | --- | --- | --- | --- |
| | Parameter | | Example 1 | Example 2 | Example 3 |
| | Quantity of transmission layers (Layer number): $N_L$ | | 1 | 1 | 1 |
| | Modulation order (Modulation order): $Q_m$ | | 4 | 6 | 4 |
| | $G_{rvd}^{ACK}$ | | 132 | 162 | 116 |
| | $G^{CSI-part1}$ | | 348 | 414 | 172 |
| | $G^{CSI-part2}$ | | 132 | 162 | 116 |
| Hop 1 | $M_1$ | | 60 | 48 | 36 |
| | $G_{rvd}^{ACK}(1) = N_L \cdot Q_m \cdot \lfloor G_{rvd}^{ACK}/(2 \cdot N_L \cdot Q_m)\rfloor$ | | 64 | 78 | 56 |
| | $G^{CSI-part1}(1) = \min(N_L \cdot Q_m \cdot \lfloor G^{CSI-part1}/(2 \cdot N_L \cdot Q_m)\rfloor,$ $M_1 \cdot N_L \cdot Q_m - G^{ACK}(1))$ | | 172 | 204 | 84 |
| | $G^{CSI-part2}(1) = M_1 \cdot N_L \cdot Q_m - G^{CSI-part1}(1)$ | | 68 | 84 | 60 |

TABLE 1-continued

|  | Parameter | Incorrect example value | | |
|---|---|---|---|---|
|  |  | Example 1 | Example 2 | Example 3 |
| Hop 2 | $M_2$ | 60 | 48 | 36 |
|  | $G_{rvd}^{ACK}(2) = N_L \cdot Q_m \cdot \lceil G_{rvd}^{ACK}/(2 \cdot N_L \cdot Q_m) \rceil$ | 68 | 84 | 60 |
|  | Quantity of coded bits transmitted on a non-reserved RE: $M_2 \cdot N_L \cdot Q_m - G_{rvd}^{ACK}(2)$ | 172 | 204 | 84 |
|  | $G^{CSI\text{-}part1}(2) = G^{CSI\text{-}part1} - G^{CSI\text{-}part1}(1)$ | 176 | 210 | 88 |
|  | $G^{CSI\text{-}part2}(2) = M_2 \cdot N_L \cdot Q_m - G^{CSI\text{-}part1}(2)$ | 64 | 78 | 56 |

It can be learned from the second last row and the third last row in Table 1 that, the quantity of coded bits transmitted on the non-reserved RE on the hop 2 is different front a quantity of coded bits that are of the CSI-part1 and that are mapped onto the non-reserved RE. Therefore, the CSI-part1 cannot be completely carried on the non-reserved RE on the hop 2, and consequently, the CSI-part1 is incompletely sent. It can be learned from the last row and the fourth last row in Table 1 that, the quantity $G_{rvd}^{ACK}(2)$ coded bits mapped onto the reserved RE on the hop 2 is greater than a quantity of coded bits that are of the CSI-part2 and that are mapped onto the hop 2. Therefore, there is no data to be sent on some reserved REs. When the PUSCH uses DFT-s-OFDM, a single-carrier low PAPR characteristic is damaged.

The foregoing example is merely for description.

Table 2 shows a result of calculation by using the communication method provided in this application. It can be learned front the second last row and the third last row in Table 2 that, the quantity of coded bits transmitted on the non-reserved RE on the hop 2 is the same as the quantity of coded bits that are of the CSI-part1 and that are mapped onto the non-reserved RE. It can be learned from the last row and the fourth last row in Table 2 that, the quantity $G_{rvd}^{ACK}(2)$ of coded bits mapped onto the reserved RE on the hop 2 is equal to the quantity of coded bits that are of the CSI-part2 and that are mapped onto the hop 2, and there is data to be sent on all reserved REs. It can be learned that, in the calculation method in the present invention, both the quantities of coded bits mapped onto the non-reserved REs in the two hops and the quantities of coded bits of the CSI-part1 on the two hops are consistent, thereby resolving the problem in the prior art.

A frequency hopping splitting rule for the quantity of coded bits of an HARQ-ACK provided in the prior art is as follows:

Assuming that a quantity of coded bits of the HARQ-ACK is $G^{ACK}$, quantities of coded bits of the HARQ-ACK that are sent on the hop and the hop 2 are respectively:

$$G^{ACK}(1)=\min(N_L \cdot Q_m \cdot \lfloor G^{ACK}/(2 \cdot N_L \cdot Q_m) \rfloor, M_3 \cdot N_L \cdot Q_m) \quad (X)$$

$$G^{ACK}(2)=G^{ACK}-G^{ACK}(1).$$

A problem of the foregoing splitting rule is that a non-reserved RE on the hop 1 is insufficient to carry a quantity of coded bits of the CSI-part1 on the hop 1, and consequently, the CSI-part1 is incompletely sent.

Reasons are as follows:

In the formula (X), a function of taking a parameter $M_1 N_L \cdot Q_m - G^{ACK}(1)$ on the right of the minimum function min (·, ·) is to set an upper limit (referred to as a first upper limit below) for a resource occupied for the CSI-part1 on the hop 1, that is, the CST-part1 cannot occupy a resource for the HARQ-ACK on the hop 1. However, based on a specification in a communication protocol, the CST-part1 cannot occupy the reserved RE resource on the hop 1, that is, the CSI-part1 should not be greater than an upper limit $M_1 N_L \cdot Q_m - G^{ACK}(1)$ (which is referred to as a second upper limit below).

When the quantity of HARQ-ACK information bits is 0, 1, or 2, $G^{ACK}$ is a quantity of coded bits that is calculated based on an actual quantity of HARQ-ACK information bits, and $G_{rvd}^{ACK}$ is a quantity that is of coded bits mapped onto the reserved RE and that is calculated based on the quantity of HARQ-ACK information bits being 2. Therefore, if the actual quantity of HARQ-ACK information bits is 0 or 1, $G^{ACK}<G_{rvd}^{ACK}$, and $G^{ACK}(1)<G_{rvd}^{ACK}(1)$ for the

TABLE 2

|  | Parameter | Incorrect example value | | |
|---|---|---|---|---|
|  |  | Example 1 | Example 2 | Example 3 |
|  | Quantity of transmission layers (Layer number): $N_L$ | 1 | 1 | 1 |
|  | Modulation order (Modulation order): $Q_m$ | 4 | 6 | 4 |
|  | $G_{rvd}^{ACK}$ | 132 | 162 | 116 |
|  | $G^{CSI\text{-}part1}$ | 348 | 414 | 172 |
|  | $G^{CSI\text{-}part2}$ | 132 | 162 | 116 |
| Hop 1 | $M_1$ | 60 | 48 | 36 |
|  | $G_{rvd}^{ACK}(1) = N_L \cdot Q_m \cdot \lfloor G_{rvd}^{ACK}/(2 \cdot N_L \cdot Q_m) \rfloor$ | 68 | 84 | 60 |
|  | $G^{CSI\text{-}part1}(1) = \min(N_L \cdot Q_m \cdot \lfloor G^{CSI\text{-}part1}/(2 \cdot N_L \cdot Q_m) \rfloor, M_1 \cdot N_L \cdot Q_m - G^{ACK}(1))$ | 172 | 204 | 84 |
|  | $G^{CSI\text{-}part2}(1) = M_1 \cdot N_L \cdot Q_m - G^{CSI\text{-}part1}(1)$ | 68 | 84 | 60 |
| Hop 2 | $M_2$ | 60 | 48 | 36 |
|  | $G_{rvd}^{ACK}(2) = N_L \cdot Q_m \cdot \lceil G_{rvd}^{ACK}/(2 \cdot N_L \cdot Q_m) \rceil$ | 64 | 78 | 56 |
|  | Quantity of coded bits transmitted on a non-reserved RE: $M_2 \cdot N_L \cdot Q_m - G_{rvd}^{ACK}(2)$ | 176 | 210 | 88 |
|  | $G^{CSI\text{-}part1}(2) = G^{CSI\text{-}part1} - G^{CSI\text{-}part1}(1)$ | 176 | 210 | 88 |
|  | $G^{CSI\text{-}part2}(2) = M_2 \cdot N_L \cdot Q_m - G^{CSI\text{-}part1}(2)$ | 64 | 78 | 56 | hop 1. In this case, the first upper limit is greater than the second upper limit. Consequently, the non-reserved RE on the hop 1 may be insufficient to carry the quantity $G^{CSI\text{-}part1}(1)$ of coded bits of the CSI-part1 on the hop 1.

In view of this, this application provides another communication method 600. The method 600 may be implemented based on the foregoing method, or may be implemented in combination with the foregoing method, or may be independently implemented. As shown in FIG. 6, the method includes the following steps:

S610. Receive downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is before a time-domain start symbol of the second frequency hopping resource.

S620. Send first UCI on the PUSCH, where the first UCI includes at least one of an HARQ-ACK, CSI-part 1, and CSI-part2.

A quantity $G^{CSI\text{-}part1}(1)$ of coded bits that are of the CSI-part1 in the first UCI and that are mapped onto the first frequency hopping resource is a smaller one of a fourth value and a fifth value, the fourth value is determined based on a quantity $G^{CSI\text{-}part1}$ of coded bits of the CSI-part1 in the first UCI, and the fifth value is determined based on a larger value in $G^{ACK}(1)$ and $G_{rvd}^{ACK}(1)$, or the fifth value is determined based on $G^{ACK}(1)$, where $G^{ACK}(1)$ is a quantity of coded bits that are of the HARQ-ACK in the first UCI and that are mapped onto the first frequency hopping resource, and $G_{rvd}^{ACK}(1)$ is a quantity of coded bits that can be mapped onto reserved REs in the first frequency hopping resource.

In the prior art, the fifth value is determined based only on $G^{ACK}(1)$. For example, the fifth value is $M_1 \cdot N_L \cdot Q_m' G^{ACK}(1)$ in the prior art, and this parameter sets an upper limit (namely, a first upper limit) for a resource occupied by the CSI-part1 on the first frequency hopping resource. In addition, the CSI-part1 cannot occupy the reserved RE in the first frequency hopping resource. That is, $G^{CSI\text{-}part1}(1)$ should also not be greater than an upper limit $M_1 \cdot N_L \cdot Q_m' G_{rvd}^{ACK}(1)$ (namely, a second upper limit), When a quantity of HARQ-ACK information bits is 0, 1, or 2, $G^{ACK}(1)$ is a quantity of coded bits that is calculated based on an actual quantity of HARQ-ACK information bits, and $G_{rvd}^{ACK}$ is a quantity that is of coded bits mapped onto the reserved RE and that is calculated based on the quantity of HARQ-ACK information bits being 2. Therefore, if the actual quantity of HARQ-ACK information bits is 0 or 1, and $G^{ACK}(1) < G_{rvd}^{ACK}(1)$. That is, on the first frequency hopping resource, $G^{ACK} < G_{rvd}^{ACK}$. In this case, the first upper limit is greater than the second upper limit. In the prior art, if the fifth value is determined based only on $G^{ACK}(1)$, a non-reserved RE in the first frequency hopping resource may be insufficient for carrying the quantity $G^{CSI\text{-}part1}(1)$ of coded bits of the CSI-part1 on the first frequency hopping resource.

In the solution provided in this application, the fifth value is determined based on the larger one of $G^{ACK}(1)$ and $G_{rvd}^{ACK}(1)$ (where when the quantity of HARQ-ACK hits is greater than 2, $G_{rvd}^{ACK}(1)$ is equal to 0), to ensure that $G^{CSI\text{-}part1}(1)$ is calculated by using an actual non-reserved RE in the first frequency hopping resource as a reference, thereby avoiding the foregoing problem that the CSI-part1 is incompletely sent.

Optionally, that the fifth value is determined based on a larger value in $G^{ACK}(1)$ and $G_{rvd}^{ACK}(1)$ includes that the fifth value is equal to $M_1 \cdot N_L \cdot Q_m - \max(G^{ACK}(1), G_{rvd}^{ACK}(1))$; or that the fifth value is determined based on $G^{ACK}(1)$ includes: the fifth value is equal to $M_1 \cdot N_L \cdot Q_m - G^{ACK}(1)$ when the quantity of HARQ-ACK bits is greater than 2; or the fifth value is equal to $M_1 \cdot N_L \cdot Q_m - \max(G^{ACK}(1), G_{rvd}^{ACK}(1))$ when the quantity of HARQ-ACK bits is less than or equal to 2.

$M_1$ is a quantity of REs that can carry data and that are in the first frequency hopping resource, $N_L$ is a quantity of transmission layers of the PUSCH, and $Q_m$ is a modulation order of the first UCI.

Optionally, that the fourth value is determined based on a quantity $G^{CSI\text{-}part1}$ of coded bits of the CSI-part1 in the first UCI includes: the fourth value is equal to $N_L \cdot Q_m \cdot \lceil G^{CSI\text{-}part1}/(2 \cdot N_L \cdot Q_m) \rceil$, where $N_L$ is the quantity of transmission layers of the PUSCH, and $Q_m$ is the modulation order of the first UCI.

The method 600 may be separately implemented, or may be jointly implemented with the method 400.

This application further provides a communication method. As shown in FIG. 7, the method 700 includes the following steps:

S710. Send downlink control information, where the downlink control nation is used to schedule a PUSCH, the PUSCH is used to carry only UCI, the PUSCH includes a first frequency hopping resource and a second frequency hopping resource, and a time-domain start symbol of the first frequency hopping resource is before a time-domain start symbol of the second frequency hopping resource.

S720. Receive first UCI on the PUSCH, where the first UCI includes at least one of an HARQ-ACK, CSI-part1, and CSI-part2, where a quantity of coded bits that can be mapped onto reserved REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for transmitting potential HARQ-ACK which has less than or equal to 2 bits.

A reason that information in the CSI-part1 is incompletely sent is that a quantity of coded bits that are of the CSI-part1 and that are mapped onto the second frequency hopping resource is relatively small. In other words, a quantity of REs on the second frequency hopping resource that are used to map the CSI-part1 is relatively small, and consequently, the CSI-part1 cannot be all mapped onto the second frequency hopping resource. Compared with the prior art, this application reduces a quantity of coded bits that are capable of being mapped onto reserved REs in the second frequency hopping resource, thereby increasing a quantity of REs that are in the second frequency hopping resource and that are used to map the CSI-part1. This resolves a problem that due to UCI transmission through frequency hopping in a UCI-only scenario, information in the CSI-part1 is incompletely sent.

A person skilled in the art may understand that the method 700 corresponds to the method 400. For brevity, details are not described herein again.

Optionally, the first value is $G_{rvd}^{ACK}(1)$, and $G_{rvd}^{ACK}(1) = N_L \cdot Q_m \cdot \lceil G_{rvd}^{ACK}/(2 \cdot N_L \cdot Q_m) \rceil$; and/or the second value is $G_{rvd}^{ACK}(2)$, and $G_{rvd}^{ACK}(2) = N_L \cdot Q_m \cdot \lceil G_{rvd}^{ACK}/(2 \cdot N_L \cdot Q_m) \rceil$, where $N_L$ is a quantity of transmission layers of the PUSCH, and $Q_m$ is a modulation order of the first UCI.

Optionally, $G_{rvd}^{ACK}(1)=N_L \cdot Q_m \cdot \lceil G_{rvd}^{ACK}/(2 \cdot N_L \cdot Q_m) \rceil)$, and $G_{rvd}^{ACK}(2)=G_{rvd}^{ACK}-G_{rvd}^{ACK}(1)$; or
$G_{rvd}^{ACK}(2)=N_L \cdot Q_m \cdot \lfloor G_{rvd}^{ACK}/(2 \cdot N_L \cdot Q_m) \rfloor)$, and $G_{rvd}^{ACK}(1)=G_{rvd}^{ACK}-G_{rvd}^{ACK}(2)$.

Optionally, a quantity of coded bits that are of the HARQ-ACK in the first UCI and that are mapped onto the first frequency hopping resource is $G^{ACK}(1)$ and a value of $G^{ACK}(1)$ is a smaller one of the following two values:

a quantity of coded bits mapped onto an RE that is after a first group of consecutive DMRS symbols on the first frequency hopping resource and that are capable of being used to carry data, and a third value that is determined based on $G^{ACK}$, where $G^{ACK}$ is a quantity of coded bits of the HARQ-ACK in the first UCI.

Optionally, a value of the quantity of coded bits mapped onto the RE that is after the first group of consecutive DMRS symbols on the first frequency hopping resource and that are capable of being used to carry data is equal to $M_3 \cdot N_L \cdot Q_m$, where $M_3$ is a quantity of REs that are after the first group of consecutive DMRS symbols on the first frequency hopping resource and that are capable of being used to carry data, $N_L$ is the quantity of transmission layers of the PUSCH, $Q_m$ is the modulation order of the first UCI, and the third value is $N_L \cdot Q_m \cdot \lceil G_{rvd}^{ACK}/(2 \cdot N_L \cdot Q_m) \rceil$. The quantity of bits of the HARQ-ACK in the first UCI is no greater than 2.

The foregoing solution is content described in a formula $G^{ACK}(1)=\min(N_L \cdot Q_m \cdot \lceil G^{ACK}/(2 \cdot N_L \cdot Q_m) \rceil, M_3 \cdot N_L \cdot Q_m)$.

Optionally, a quantity of coded bits that are of the HARQ-ACK in the first UCI and that are mapped onto the second frequency hopping resource is $G^{ACK}(2)$, where $G^{ACK}(2)=G^{ACK}-G^{ACK}(1)$.

This application further provides a communication method. As shown in FIG. 8 the method 800 includes the following steps:

S810. Send downlink control information, where the downlink control formation is used to schedule a PUSCH, the PUSCH is used to carry only UCI, the PUSCH includes a first frequency hopping resource and a second frequency hopping resource, and a time-domain start symbol of the first frequency hopping resource is before a time-domain start symbol of the second frequency hopping resource.

S820. Receive first UCI on the PUSCH, where the first UCI includes at least one of an HARQ-ACK, CSI-part1, and CSI-part2.

A quantity $G^{CSI-part1}(1)$ of coded bits that are of the CSI-part1 in the first UCI and that are mapped onto the first frequency hopping resource is a smaller one of a fourth value and a fifth value, the fourth value is determined based on a quantity $G^{CSI-part1}$ of coded bits of the CSI-part1 in the first UCI, and the fifth value is determined based on a larger value in $G^{ACK}(1)$ and $G^{ACK}(1)$, or the fifth value is determined based on $G^{ACK}(1)$, where $G^{ACK}(1)$ is a quantity of coded bits that are of the HARQ-ACK in the first UCI and that are mapped onto the first frequency hopping resource, and $G_{rvd}^{ACK}(1)$ is a quantity of coded bits that can be mapped onto reserved REs in the first frequency hopping resource.

In the prior art, the fifth value is determined based only on $G^{ACK}(1)$. For example, the fifth value is $M_1 \cdot N_L \cdot Q_m - G^{ACK}(1)$ in the prior art, and this parameter sets an upper limit (namely, a first upper limit) for a resource occupied by the CSI-part1 on the first frequency hopping resource. In addition, the CSI-part1 cannot occupy the reserved RE in the first frequency hopping resource. That is, $G^{CSI-part1}(1)$ should also not be greater than an upper limit $M_1 \cdot N_L \cdot Q_m - G_{rvd}^{ACK}$ (1) (namely, a second upper limit). When a quantity of HARQ-ACK information bits is 0, 1, or 2, $G^{ACK}(1)$ is a quantity of coded bits that is calculated based on an actual quantity of HARQ-ACK information bits, and $G_{rvd}^{ACK}$ is a quantity that is of coded bits mapped onto the reserved RE and that is calculated based on the quantity of HARQ-ACK information bits being 2. Therefore, if the actual quantity of HARQ-ACK information bits is 0 or 1, $G^{ACK}<G_{rvd}^{ACK}$, and $G^{ACK}(1)<G_{rvd}^{ACK}(1)$. That is, on the first frequency hopping resource, $G^{ACK}<G_{rvd}^{ACK}$. In this case, the first upper limit is greater than the second upper limit. In the prior art, if the fifth value is determined based only on $G^{ACK}(1)$, a non-reserved RE in the first frequency hopping resource may be insufficient for carrying the quantity $G^{CSI-part1}(1)$ of coded bits of the CSI-part1 on the first frequency hopping resource.

In the solution provided in this application, the fifth value is determined based on the larger one of $G^{ACK}(1)$ and $G_{rvd}^{ACK}(1)$ (where when the quantity of HARQ-ACK hits is greater than 2, (1) is equal to 0), to ensure that $G^{CSI-part1}(1)$ is calculated by using an actual non-reserved RE in the first frequency hopping resource as a reference, thereby avoiding the foregoing problem that the CSI-part1 is incompletely sent.

A person skilled in the art may understand that the method 800 corresponds to the method 600. For brevity, details are not described herein again.

Optionally, that the fifth value is determined based on a larger value in $G^{ACK}(1)$ and $G_{rvd}^{ACK}(1)$, includes that the fifth value is equal to $M_1 \cdot N_L \cdot Q_m - \max(G^{ACK}(1), G_{rvd}^{ACK}(1))$; or that the fifth value is determined based on $G^{ACK}(1)$ includes: the fifth value is equal to $M_1 \cdot N_L \cdot Q_m - G^{ACK}(1)$ when the quantity of HARQ-ACK bits is greater than 2; or the fifth value is equal to $M_1 \cdot N_L \cdot Q_m - \max(G^{ACK}(1), G_{rvd}^{ACK}(1))$ when the quantity of HARQ-ACK bits is less than or equal to 2.

$M_1$ is a quantity of REs that can carry data and that are in the first frequency hopping resource, $N_L$ is a quantity of transmission layers of the PUSCH, and $Q_m$ is a modulation order of the first UCI.

Optionally, that the fourth value is determined based on a quantity $G^{CSI-part1}$ of coded bits of the CSI-part1 in the first UCI includes: the fourth value is equal to $N_L \cdot Q_m \cdot \lfloor G^{CSI-part1}/(2 \cdot N_L \cdot Q_m) \rfloor$, where $N_L$ is the quantity of transmission layers of the PUSCH, and $Q_m$ is the modulation order of the first UCI.

In another implementation, a communication method is provided, where the method includes:

receiving indication information, where the indication information is used to schedule a physical uplink shared channel PUSCH, the PUSCH includes a first frequency hopping resource and a second frequency hopping resource, and a time-domain start symbol of the first frequency hopping resource is before a time-domain start symbol of the second frequency hopping resource; and sending first UCI on the PUSCH, where the first UCI includes at least one of a transmission hybrid automatic repeat request-acknowledgment HARQ-ACK, a channel state information part 1 CSI-part1, and a channel state information part 2 CSI-part2.

A quantity of coded bits that can be mapped onto reserved resource elements REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for transmitting potential HARQ-ACK which a bit quantity is not greater than 2.

Optionally, the method may be performed by a terminal device, or may be performed by an apparatus or a chip that is integrated into a terminal device or that is independent from a terminal device.

Correspondingly, this implementation provides an apparatus, where the apparatus includes:

a receiving unit, configured to receive indication information, where the indication information is used to schedule a physical uplink shared channel PUSCH, the PUSCH includes a first frequency hopping resource and a second frequency hopping resource, and a time-domain start symbol of the first frequency hopping resource is before a time-domain start symbol of the second frequency hopping resource; and a sending unit, configured to send first UCI on the PUSCH, where the first UCI includes at least one of a transmission hybrid automatic repeat request-acknowledgment HARQ-ACK, channel state information part 1 CST-part1, and a channel state information part 2 CSI-part2.

A quantity of coded bits that can be mapped onto reserved resource elements REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for potential HARQ-ACK transmission in which a bit quantity is not greater than 2.

This implementation further provides another communication method, corresponding to the previous communication method provided by this implementation. The two communication methods are performed by both interaction parties. The method includes:

sending indication information, where the indication information is used to schedule a physical uplink shared channel PUSCH, the PUSCH includes a first frequency hopping resource and a second frequency hopping resource, and a time-domain start symbol of the first frequency hopping resource is before a time-domain start symbol of the second frequency hopping resource; and receiving first UCI on the PUSCH, where the first UCI includes at least one of a transmission hybrid automatic repeat request-acknowledgment HARQ-ACK, a channel state information part 1 CSI-part1, and a channel state information part 2 CSI-part2.

A quantity of coded bits that can be mapped onto reserved resource elements REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for potential HARQ-ACK transmission in which a bit quantity is not greater than 2.

Optionally, the method may be performed by a network device, or may be performed by an apparatus or a chip that is integrated into a network device or that is independent front a network device.

Correspondingly, this implementation provides an apparatus, where the apparatus includes:

a sending unit, configured to send indication information, where the indication information is used to schedule a physical uplink shared channel PUSCH, the PUSCH includes a first frequency hopping resource and a second frequency hopping resource, and a time-domain start symbol of the first frequency hopping resource is before a time-domain start symbol of the second frequency hopping resource; and a receiving unit, configured to receive first UCI on the PUSCH, where the first UCI includes at least one of a transmission hybrid automatic repeat request-acknowledgment HARQ-ACK, a channel state information part 1 CSI-part1, and a channel state information part 2 CSI-part2.

A quantity of coded bits that can be mapped onto reserved resource elements REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for potential HARQ-ACK transmission in which a bit quantity is not greater than 2.

Further, in this implementation:

In an optional design, the PUSCH includes an uplink shared channel UL-SCH, the first UCI includes the HARQ-ACK, a quantity of coded bits that are of the HARQ-ACK and that are mapped onto the first frequency hopping resource is a sixth value, and a quantity of coded bits that are of the HARQ-ACK and that are mapped onto the second frequency hopping resource is a seventh value, where the sixth value is not less than the seventh value.

In an optional design, a quantity of mapped coded bits of the HARQ-ACK included in the first UCI is $G^{ACK,withUL-SCH}$; and the sixth value is $G^{ACK,withUL-SCH}(1)$, and $G^{ACK,withUL-SCH}(1)=N_L \cdot Q_m \cdot \lceil G^{ACK,withUL-SCH}/(2 \cdot N_L \cdot Q_m) \rceil$;

and/or the seventh value is $G^{ACK,withUL-SCH}(2)$, and $G^{ACK,withUL-SCH}(2)=N_L \cdot Q_m \cdot \lfloor G^{ACK,withUL-SCH}/(2 \cdot N_L \cdot Q_m) \rfloor$, where $N_L$ is a quantity of transmission layers of the PUSCH, and $Q_m$ is a modulation order of the UL-SCH and the first UCI.

In an optional design, the sixth value is $G^{ACK,withUL-SCH}(1)=N_L \cdot Q_m \cdot \lceil G_{rvd}^{ACK,withUL-SCH}/(2 \cdot N_L \cdot Q_m) \rceil$, and the seventh value is $G^{ACK,withUL-SCH}(2)=G^{ACK,withUL-SCH} \ldots G^{ACK,withUL-SCH}(1)$; or the seventh value is $G^{ACK,withUL-SCH}(2)=(2)=N_L \cdot Q_m \cdot \lfloor G^{ACK,withUL-SCH}/(2 \cdot N_L \cdot Q_m) \rfloor$, and the sixth value is $G^{ACK,withUL-SCH}(1)=G^{ACK,withUL-SCH} \ldots G^{ACK,withUL-SCH}(2)$.

It should be noted that, for definitions of the parameters used in this implementation, refer to the foregoing description and explanation.

The foregoing describes in detail examples of the communication methods provided in this application. It can be understood that, to implement the foregoing functions, the communications apparatus includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the communications apparatus may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, unit division in this application is an example, and is merely logical function division. During actual implementation, another division manner may be used.

Figure 9:
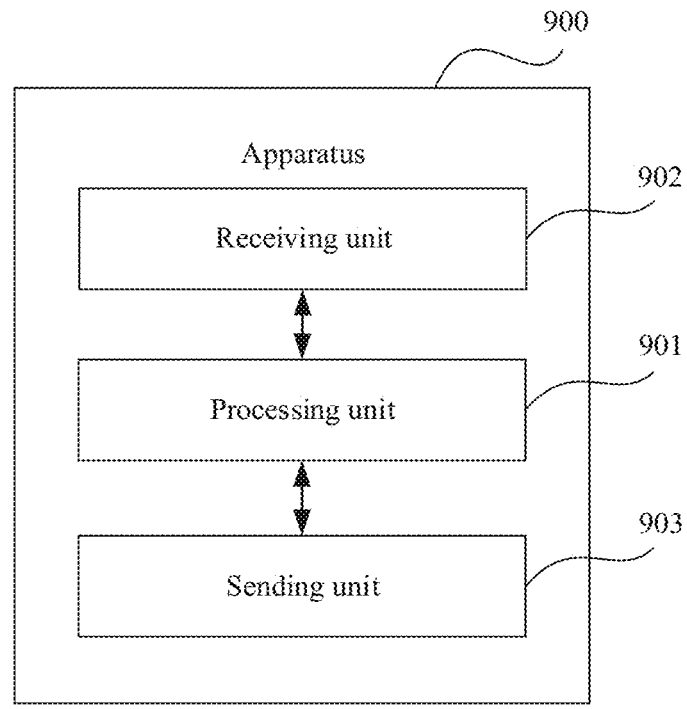
FIG. 9 is a schematic diagram of a communications apparatus according to this application.

When an integrated unit is used, FIG. 9 is a possible schematic structural diagram of a communications apparatus according to this application. The apparatus 900 includes a processing unit 901, a receiving unit 902, and a sending unit 903. The processing unit 901 is configured to control the apparatus 900 to perform the steps of the communication method shown in FIG. 4. The processing unit 901 may be further configured to perform another process of the technology described in this specification. The apparatus 900 may further include a storage unit, configured to store program code and data of the apparatus 900.

For example, the processing unit 901 is configured to control the receiving unit 902 to receive downlink control information, where the downlink control information is used to schedule a physical uplink shared channel PUSCH, the PUSCH is used to carry only uplink control information UCI, the PUSCH includes a first frequency hopping resource and a second frequency hopping resource, and a time-domain start symbol of the first frequency hopping resource is before a time-domain start symbol of the second frequency hopping resource.

The processing unit 901 is further configured to control the sending unit 903 to send first UCI on the PUSCH, where the first UCI includes at least one of a hybrid automatic repeat request-acknowledgment HARQ-ACK, a channel state information part 1 CSI-part1, and a channel state information part 2 CSI-part2.

A quantity of coded bits that can be mapped onto reserved resource elements REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for transmitting potential HARQ-ACK which has less than or equal to 2 bits.

The processing unit 901 may be a processor or a controller, such as a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logical device, a transistor logical device, a hardware component, or any combination thereof. The processor may implement or execute various example logical blocks, modules, and circuits described with reference to content disclosed in this application. Alternatively, the processor may be a combination implementing a computing function, for example, a combination of one or more microprocessors, or a combination of a DSP and a microprocessor. For example, the sending unit 903 and the receiving unit 902 are a transceiver, and the storage unit may be a memory.

Figure 10:
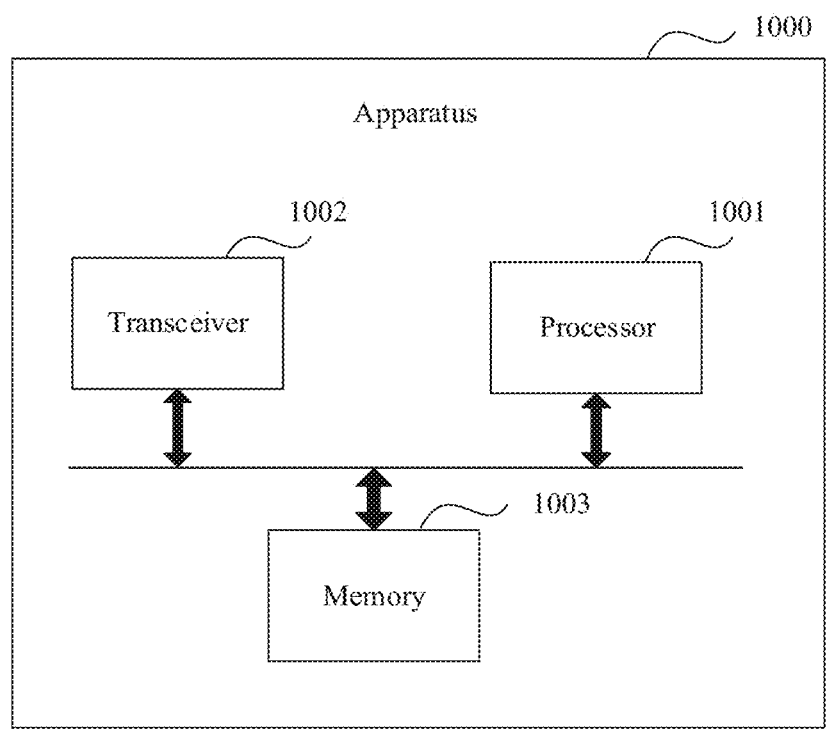
FIG. 10 is a schematic diagram of another communications apparatus according to this application.

When the processing unit 901 is a processor, the sending unit 903 and the receiving unit 902 are a transceiver, and the storage unit is a memory, the communications apparatus in this application may be an apparatus shown in FIG. 10.

Referring to FIG. 10, the apparatus 1000 includes a processor 1001, a transceiver 1002, and a memory 1003 (optional). The processor 1001, the transceiver 1002, and the memory 1003 may communicate with each other by using an internal connection path, to transfer a control signal and/or a data signal.

It may be clearly understood by a person skilled in the art that, for ease of brief description, for detailed working processes of the foregoing apparatuses and units, refer to corresponding processes in the foregoing method embodiments, and details are not described herein again.

According to the communications apparatus provided in this application, a CSI-part1 mapping rule is changed, to resolve a problem that due to UCI transmission through frequency hopping in a UCI-only scenario, information in CSI-part1 is incompletely sent.

Figure 11:
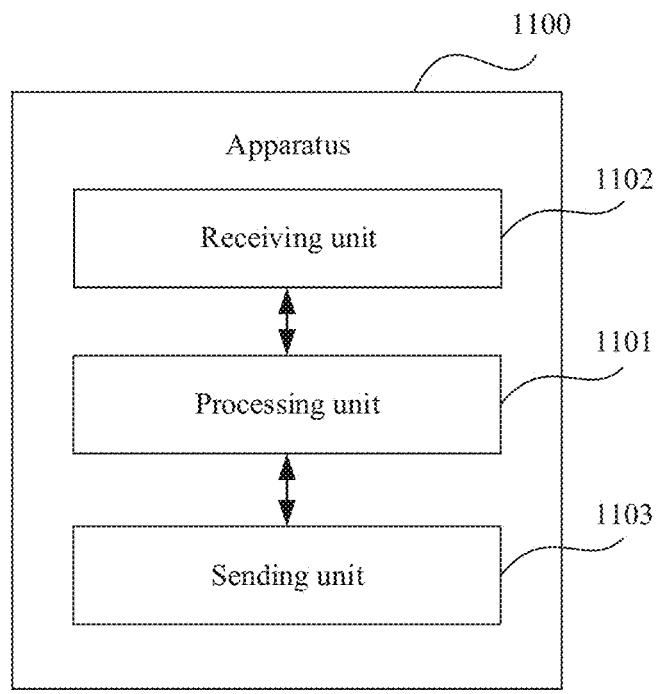
FIG. 11 is a schematic diagram of still another communications apparatus according to this application.

When an integrated unit is used, FIG. 11 is a possible schematic structural diagram of another communications apparatus according to this application. The apparatus 1100 includes a processing unit 1101, a receiving unit 1102, and a sending unit 1103. The processing unit 1101 is configured to control the apparatus 1100 to perform the steps of the communication method shown in FIG. 6. The processing unit 1101 may be further configured to perform another process of the technology described in this specification. The apparatus 1100 may further include a storage unit, configured to store program code and data of the apparatus 1100.

For example, the processing unit 1101 is configured to control the receiving unit 1102 to receive downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is before a time-domain start symbol of the second frequency hopping resource.

The processing unit 1101 is further configured to control the sending unit 1103 to send first UCI on the PUSCH, where the first UCI includes at least one of an HARQ-ACK, CSI-part1, and CSI-part2.

A quantity $G^{CSI-part1}(1)$ of coded bits that are of the CSI-part1 in the first UCI and that are mapped onto the first frequency hopping resource is a smaller one of a fourth value and a fifth value, the fourth value is determined based on a quantity $G^{CSI-part1}$ of coded bits of the CSI-part1 in the first UCI, and the fifth value is determined based on a larger value in $G^{ACK}(1)$ and (1), or the fifth value is determined based on $G^{ACK}(1)$, where $G^{ACK}(1)$ is a quantity of coded bits that are of the HARQ-ACK in the first UCI and that are mapped onto the first frequency hopping resource, and $G_{rvd}^{ACK}(1)$ is a quantity of coded bits that can be mapped onto reserved REs in the first frequency hopping resource.

The processing unit 1101 may be a processor or a controller, for example, may be a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. Alternatively, the processor may be a combination implementing a computing function, for example, a combination of one or more microprocessors, or a combination of a DSP and a microprocessor. For example, the sending unit 1103 and the receiving unit 1102 are a transceiver, and the storage unit may be a memory.

Figure 12:
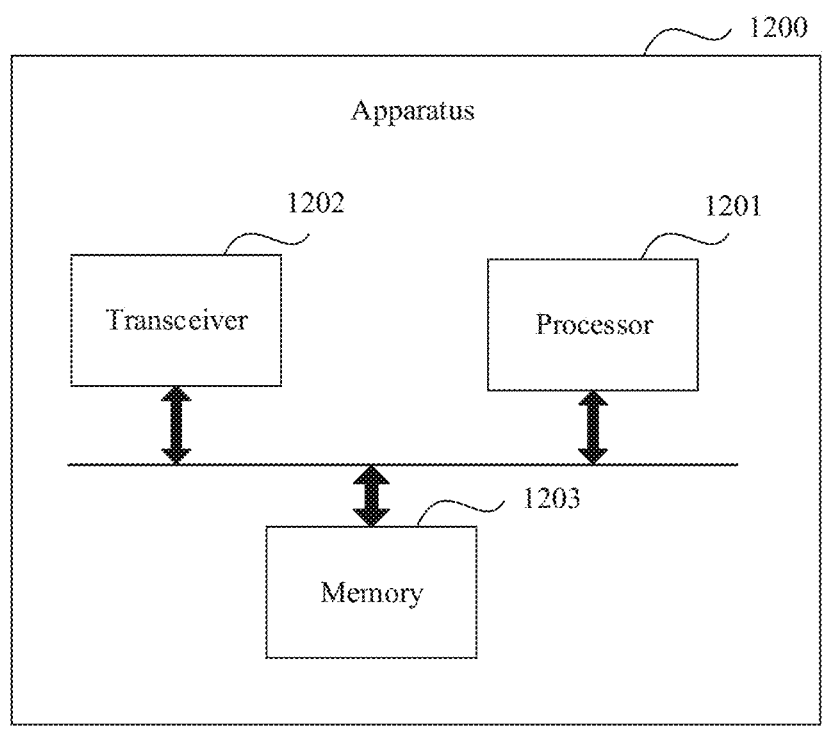
FIG. 12 is a schematic diagram of still another communications apparatus according to this application.

When the processing unit 1101 is a processor, the sending unit 1103 and the receiving unit 1102 are a transceiver, and the storage unit is a memory, the communications apparatus in this application may be an apparatus shown in FIG. 12.

Referring to FIG. 12, the apparatus 1200 includes a processor 1201, a transceiver 1202, and a memory 1203 (optional). The processor 1201, the transceiver 1202, and the memory 1203 may communicate with each other by using an internal connection path, to transfer a control signal and/or a data signal.

It may be clearly understood by a person skilled in the art that, for ease of brief description, for detailed working processes of the foregoing apparatuses and units, refer to corresponding processes in the foregoing method embodiments, and details are not described herein again.

According to the communications apparatus provided in this application, a CSI-part1 mapping rule is changed, to resolve a problem that due to UCI transmission through frequency hopping in a UCI-only scenario, information in CSI-part1 is incompletely sent.

Figure 13:
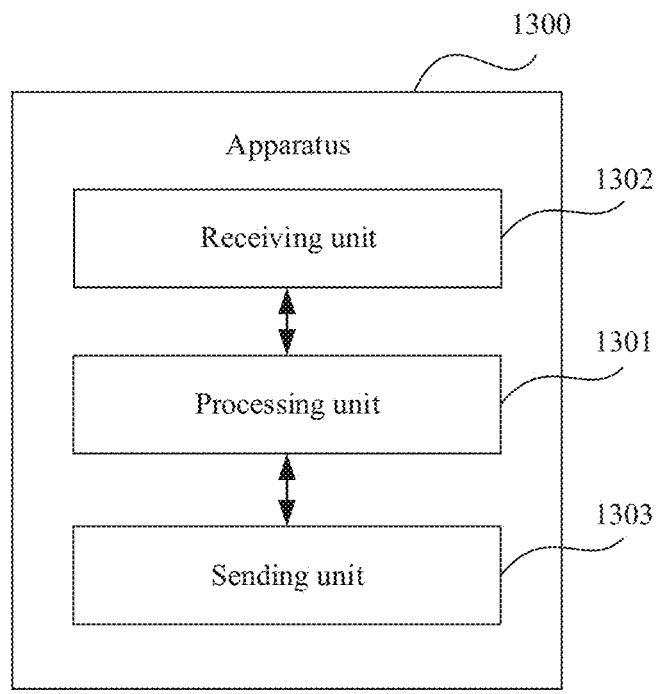
FIG. 13 is a schematic diagram of still another communications apparatus according to this application.

When an integrated unit is used, FIG. 13 is a possible schematic structural diagram of a communications apparatus according to this application. The apparatus 1300 includes a processing unit 1301, a receiving unit 1302, and a sending unit 1303. The processing unit 1301 is configured to control the apparatus 1300 to perform the steps of the communication method shown in FIG. 7. The processing unit 1301 may be further configured to perform another process of the technology described in this specification. The apparatus 1300 may further include a storage unit, configured to store program code and data of the apparatus 1300.

For example, the processing unit 1301 is configured to control the sending unit 1303 to send downlink control information, Where the downlink control information is used to schedule a physical uplink shared channel PUSCH, the PUSCH is used to carry only uplink control information UCI, the PUSCH includes a first frequency hopping resource and a second frequency hopping resource, and a time-domain start symbol of the first frequency hopping resource is before a time-domain start symbol of the second frequency hopping resource.

The processing unit 1301 is further configured to control the receiving unit 1302 to receive first UCI on the PUSCH, where the first UCI includes at least one of a hybrid automatic repeat request-acknowledgment HARQ-ACK, a channel state information part 1 CSI-part1, and a channel state information part 2 CSI-part2.

A quantity of coded bits that can be mapped onto reserved resource elements REs in the first frequency hopping resource is a first value, a quantity of coded bits that can be mapped onto reserved REs in the second frequency hopping resource is a second value, the first value is not less than the second value, and the reserved RE in the first frequency hopping resource and the reserved RE in the second frequency hopping resource are reserved for transmitting potential HARQ-ACK which has less than or equal to 2 bits.

The processing unit 1301 may be a processor or a controller, such as a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logical device, a transistor logical device, a hardware component, or any combination thereof. The processor may implement or execute various example logical blocks, modules, and circuits described with reference to content disclosed in this application. Alternatively, the processor may be a combination implementing a computing function, for example, a combination of one or more microprocessors, or a combination of a DSP and a microprocessor. For example, the sending unit 1303 and the receiving unit 1302 are a transceiver, and the storage unit may be a memory.

Figure 14:
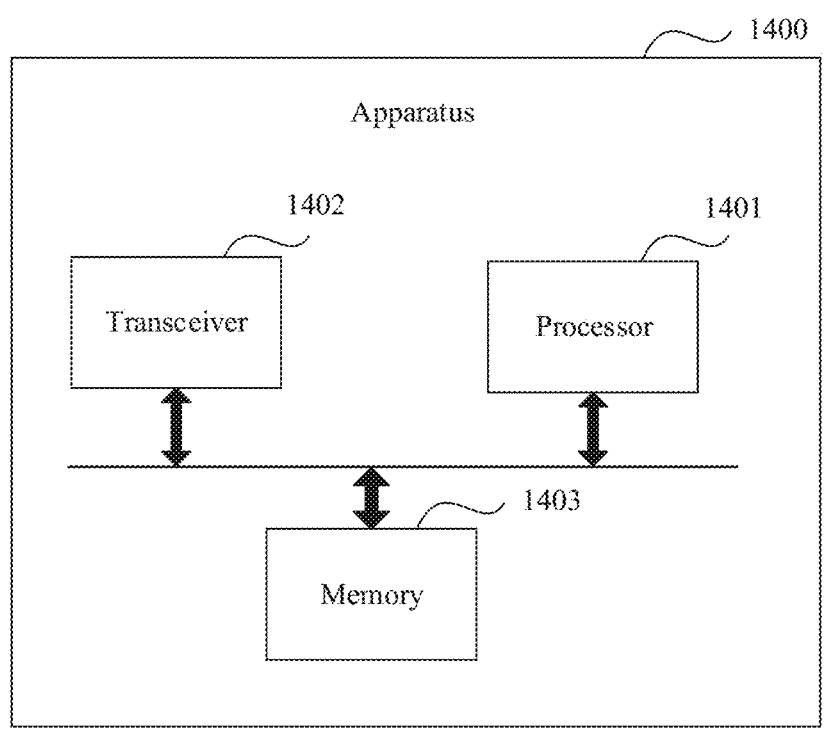
FIG. 14 is a schematic diagram of still another communications apparatus according to this application.

When the processing unit 1301 is a processor, the sending unit 1303 and the receiving unit 1302 are a transceiver, and the storage unit is a memory, the communications apparatus in this application may be an apparatus shown in FIG. 14.

Referring to FIG. 14, the apparatus 1400 includes a processor 1401, a transceiver 1402, and a memory 1403 (optional). The processor 1401, the transceiver 1402, and the memory 1403 may communicate with each other by using an internal connection path, to transfer a control signal and/or a data signal.

It may be clearly understood by a person skilled in the art that, for ease of brief description, for detailed working processes of the foregoing apparatuses and units, refer to corresponding processes in the foregoing method embodiments, and details are not described herein again.

According to the communications apparatus provided in this application, a CSI-part1 mapping rule is changed, to resolve a problem that due to UCI transmission through frequency hopping in a UCI-only scenario, information in CSI-part1 is incompletely sent.

Figure 15:
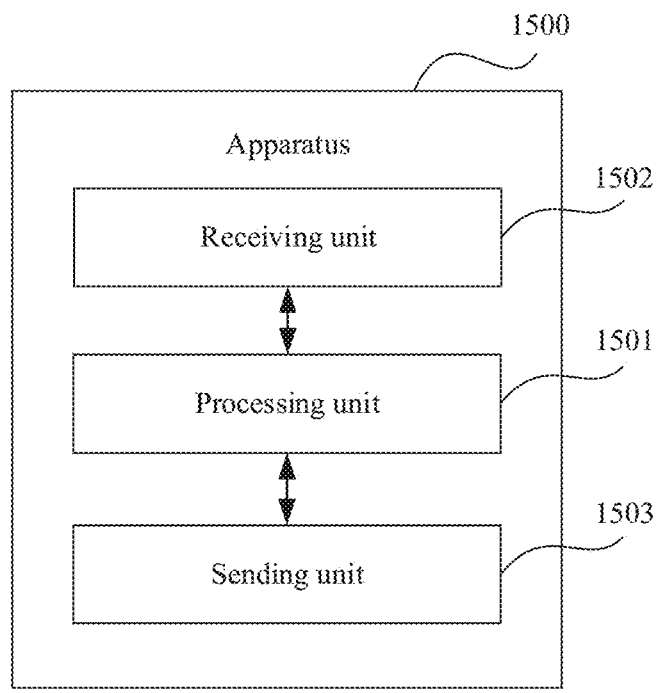
FIG. 15 is a schematic diagram of still another communications apparatus according to this application.

When an integrated unit is used, FIG. 15 is a possible schematic structural diagram of another communications apparatus according to this application. The apparatus 1500 includes a processing unit 1501, a receiving unit 1502, and a sending unit 1503. The processing unit 1501 is configured to control the apparatus 1500 to perform the steps of the communication method shown in FIG. 8. The processing unit 1501 may be further configured to perform another process of the technology described in this specification. The apparatus 1500 may further include a storage unit, configured to store program code and data of the apparatus 1500.

For example, the processing unit 1501 is configured to control the sending unit 1503 to send downlink control information, where the downlink control information is used to schedule a PUSCH, the PUSCH is used to carry only UCI, the PUSCH includes a first frequency hopping resource and a second frequency hopping resource, and a time-domain start symbol of the first frequency hopping resource is before a time-domain start symbol of the second frequency hopping resource.

The processing unit 1501 is further configured to control the receiving unit 1502 to receive first UCI on the PUSCH, where the first UCI includes at least one of an HARQ-ACK, CSI-part1, and CSI-part2.

A quantity $G^{CSI\text{-}part1}(1)$ of coded bits that are of the CSI-part1 in the first UCI and that are mapped onto the first frequency hopping resource is a smaller one of a fourth value and a fifth value, the fourth value is determined based on a quantity $G^{CSI\text{-}part1}$ of coded bits of the CSI-part1 in the first UCI, and the fifth value is determined based on a larger value in $G^{ACK}(1)$ and $G_{rvd}^{ACK}(1)$, or the fifth value is determined based on $G^{ACK}(1)$, where $G^{ACK}(1)$ is a quantity of coded bits that are of the HARQ-ACK in the first UCI and that are mapped onto the first frequency hopping resource, and $G_{rvd}^{ACK}(1)$ is a quantity of coded bits that can be mapped onto reserved REs in the first frequency hopping resource.

The processing unit 1501 may be a processor or a controller, for example, may be a CPU, a general-purpose processor, a DSP, an ASIC, are FPGA, or another programmable logic device, a transistor logic device, a hardware component, or any combination thereof. The processor may implement or execute various example logical blocks, modules, and circuits described with reference to content disclosed in this application. Alternatively, the processor may be a combination implementing a computing function, for example, a combination of one or more microprocessors, or a combination of a DSP and a microprocessor. For example, the sending unit 1502 and the receiving unit 1502 are a transceiver, and the storage unit may be a memory.

Figure 16:
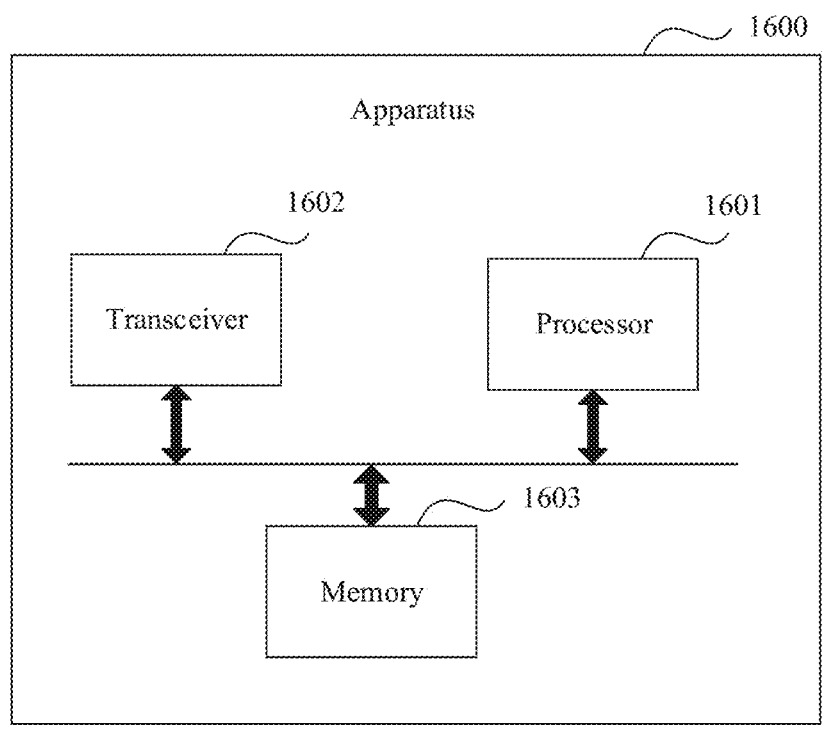
FIG. 16 is a schematic diagram of still another communications apparatus according to this application.

When the processing unit 1501 is a processor, the sending unit 1503 and the receiving unit 1502 are a transceiver, and the storage unit is a memory, the communications apparatus in this application may be an apparatus shown in FIG. 16.

Referring to FIG. 16, the apparatus 1600 includes a processor 1601, a transceiver 1602, and a memory 1603 (optional). The processor 1601, the transceiver 1602, and the memory 1603 may communicate with each other by using an internal connection path, to transfer a control signal and/or a data signal.

It may be clearly understood by a person skilled in the art that, for ease of brief description, for detailed working processes of the foregoing apparatuses and units, refer to corresponding processes in the foregoing method embodiments, and details are not described herein again.

According to the communications apparatus provided in this application, a CSI-part1 mapping rule is changed, to resolve a problem that due to UCI transmission through frequency hopping in a UCI-only scenario, information in CSI-part1 is incompletely sent.

The apparatus embodiments correspond to the method embodiments. For example, a communications unit performs an obtaining step in the method embodiments, and all steps other than the obtaining step and the sending step may be performed by the processing unit or the processor. For a function of a specific unit, refer to a corresponding method embodiment. Details are not described herein again.

It should be understood that sequence numbers of the foregoing processes do not mean execution sequences in various embodiments of this application. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (erasable programmable ROM, EPROM), an electrically erasable programmable read only memory (electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (solid-state drive, SSD)), or the like.

The objectives, technical solutions, and benefits of this application are further described in detail in the foregoing specific embodiments, it should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A communication method, comprising:
receiving downlink control information, wherein the downlink control information is used to schedule a physical uplink shared channel (PUSCH), wherein the PUSCH is used to carry only first uplink control information (UCI), wherein the PUSCH comprises a first frequency hopping resource and a second frequency hopping resource, and wherein a time-domain start symbol of the first frequency hopping resource is before a time-domain start symbol of the second frequency hopping resource; and
sending the first UCI on the PUSCH, wherein the first UCI comprises a channel state information part 1 (CSI-part1), or the first UCI comprises a hybrid automatic repeat request-acknowledgment (HARQ-ACK) and the CSI-part1, wherein:
when a quantity of HARQ-ACK bits is greater than 2, $G^{CSI\text{-}part1}(1)=\min(N_L \cdot Q_m \cdot \lceil G^{CSI\text{-}part1}/(2 \cdot N_L \cdot Q_m) \rceil, M_1 \cdot N_L \cdot Q_m - G^{ACK}(1))$;
when a quantity of HARQ-ACK bits is less than or equal to 2, $G^{CSI\text{-}part1}(1)=\min(N_L \cdot Q_m \cdot \lceil G^{CSI\text{-}part1}/(2 \cdot N_L \cdot Q_m) \rceil, M_1 \cdot N_L \cdot Q_m - G_{rvd}^{ACK}(1))$;
wherein $G^{CSI\text{-}part1}(1)$ is a quantity of coded bits that are of the CSI-part1 in the first UCI and that are mapped onto the first frequency hopping resource, $G^{CSI\text{-}part1}(1)$ is a quantity of coded bits of the CSI-part1 in the first UCI;

$$M_1 = \sum_{l=0}^{N_{symb,hop}^{PUSCH}(1)-1} M_{SC}^{UCI}(l),$$

$N_{symb,hop}^{PUSCH}(1)$ is a quantity of symbols in the first frequency hopping resource, $M_{sc}^{UCI}(1)$ is a quantity of resource elements (REs) that can carry UCI data on a symbol l, $N_L$ is a quantity of transmission layers of the PUSCH, $Q_m$ is a modulation order of the PUSCH, $G^{ACK}(1)$ is a quantity of coded bits that are of the HARQ-ACK in the first UCI and that are mapped onto the first frequency hopping resource, $G_{rvd}^{ACK}(1)$ is a quantity of coded bits that can be mapped onto reserved REs in the first frequency hopping resource, and the reserved REs in the first frequency hopping resource are reserved for transmitting potential HARQ-ACK which has less than or equal to 2 bits.

2. The method according to claim 1, wherein:
$G_{rvd}^{ACK}(1) = N_L \cdot Q_m \cdot \lceil G_{rvd}^{ACK}/(2 \cdot N_L \cdot Q_m) \rceil$,
$G^{ACK}(1)\min = (N_L \cdot Q_m \cdot \lceil G^{ACK}/(2 \cdot N_L \cdot Q_m) \rceil, M_3 \cdot N_L \cdot Q_m)$,
wherein $G_{rvd}^{ACK}$ is a sum of a quantity of coded bits mapped onto the reserved REs in the first frequency hopping resource and a quantity of coded bits mapped onto reserved REs in the second frequency hopping resource, wherein $G^{ACK}$ is a quantity of coded bits of the HARQ-ACK in the first UCI, and wherein $M_3$ is a quantity of REs that are after a first group of consecutive demodulation reference signal (DMRS) symbols on the first frequency hopping resource and are capable of being used to carry data.

3. A communication method, comprising:
sending downlink control information, wherein the downlink control information is used to schedule a physical uplink shared channel (PUSCH), wherein the PUSCH is used to carry only first uplink control information (UCI), wherein the PUSCH comprises a first frequency hopping resource and a second frequency hopping resource, and wherein a time-domain start symbol of the first frequency hopping resource is before a time-domain start symbol of the second frequency hopping resource; and
receiving the first UCI on the PUSCH, wherein the first UCI comprises a channel state information part 1 (CSI-part1), or the first UCI comprises a hybrid automatic repeat request-acknowledgment (HARQ-ACK) and the CSI-part1, wherein:
when a quantity of HARQ-ACK bits is greater than 2, $G^{CSI\text{-}part1}(1) = \min(N_L \cdot Q_m \cdot \lceil G^{CSI\text{-}part1}/(2 \cdot N_L \cdot Q_m) \rceil, M_1 \cdot N_L \cdot Q_m - G^{ACK}(1))$;
when a quantity of HARQ-ACK bits is less than or equal to 2, $G^{CSI\text{-}part1}(1) = \min(N_L \cdot Q_m \cdot \lceil G^{CSI\text{-}part1}/(2 \cdot N_L \cdot Q_m) \rceil, M_1 \cdot N_L \cdot Q_m - G_{rvd}^{ACK}(1))$;
wherein $G^{CSI\text{-}part1}(1)$ is a quantity of coded bits that are of the CSI-part1 in the first UCI and that are mapped onto the first frequency hopping resource, $G^{CSI\text{-}part1}$ is a quantity of coded bits of the CSI-part1 in the first UCI;

$$M_1 = \sum_{l=0}^{N_{symb,hop}^{PUSCH}(1)-1} M_{SC}^{UCI}(l),$$

$N_{symb,hop}^{PUSCH}(1)$ quantity of symbols in the first frequency hopping resource, $M_{sc}^{UCI}(1)$ is a quantity of resource elements (REs) that can carry UCI on a symbol l, $N_L$ is a quantity of transmission layers of the PUSCH, $Q_m$ is a modulation order of the PUSCH, $G^{ACK}(1)$ is a quantity of coded bits that are of the HARQ-ACK in the first UCI and that are mapped onto the first frequency hopping resource, $G_{rvd}^{ACK}(1)$ is a quantity of coded bits that can be mapped onto reserved REs in the first frequency hopping resource, and the reserved REs in the first frequency hopping resource is reserved for transmitting potential HARQ-ACK which has less than or equal to 2 bits.

4. The method according to claim 3, wherein:
$G_{rvd}^{ACK}(1) = N_L \cdot Q_m \cdot \lceil G_{rvd}^{ACK}/(2 \cdot N_L \cdot Q_m) \rceil$,
$G^{ACK}(1)\min = (N_L \cdot Q_m \cdot \lceil G^{ACK}/(2 \cdot N_L \cdot Q_m) \rceil, M_3 \cdot N_L \cdot Q_m)$,
wherein $G_{rvd}^{ACK}$ is a sum of a quantity of coded bits mapped onto the reserved REs in the first frequency hopping resource and a quantity of coded bits mapped onto reserved REs in the second frequency hopping resource, wherein $G^{ACK}$ is a quantity of coded bits of the HARQ-ACK in the first UCI, and wherein $M_3$ is a quantity of REs that are after a first group of consecutive demodulation reference signal (DMRS) symbols on the first frequency hopping resource and are capable of being used to carry data.

5. A communications apparatus, comprising:
one or more processors, and
a storage medium storing program instructions, wherein, when executed by the one or more processors, the program instructions cause the communications apparatus to:
receive downlink control information, wherein the downlink control information is used to schedule a physical uplink shared channel (PUSCH), wherein the PUSCH is used to carry only first uplink control information (UCI), wherein the PUSCH comprises a first frequency hopping resource and a second frequency hopping resource, and wherein a time-domain start symbol of the first frequency hopping resource is before a time-domain start symbol of the second frequency hopping resource; and
send the first UCI on the PUSCH, wherein the first UCI comprises a channel state information part 1 (CSI-part1), or the first UCI comprises a hybrid automatic repeat request-acknowledgment (HARQ-ACK) and the CSI-part1, wherein:
when a quantity of HARQ-ACK bits is greater than 2, $G^{CSI\text{-}part1}(1) = \min(N_L \cdot Q_m \cdot \lceil G^{CSI\text{-}part1}/(2 \cdot N_L \cdot Q_m) \rceil, M_1 \cdot N_L \cdot Q_m - G^{ACK}(1))$;
when a quantity of HARQ-ACK bits is less than or equal to 2, $G^{CSI\text{-}part1}(1) = \min(N_L \cdot Q_m \cdot \lceil G^{CSI\text{-}part1}/(2 \cdot N_L \cdot Q_m) \rceil, M_1 \cdot N_L \cdot Q_m - G_{rvd}^{ACK}(1))$;
wherein $G^{CSI\text{-}part1}(1)$ is a quantity of coded bits that are of the CSI-part1 in the first UCI and that are mapped onto the first frequency hopping resource, $G^{CSI\text{-}part1}$ is a quantity of coded bits of the CSI-part1 in the first UCI;

$$M_1 = \sum_{l=0}^{N_{symb,hop}^{PUSCH}(1)-1} M_{SC}^{UCI}(l),$$

$N_{symb,hop}^{PUSCH}(1)$ is a quantity of symbols in the first frequency hopping resource, $M_{sc}^{UCI}(1)$ is a quantity of resource elements (REs) that can carry UCI on a symbol l, $N_L$ is a quantity of transmission layers of the PUSCH, $Q_m$ is a modulation order of the PUSCH, $G^{ACK}(1)$ is a quantity of coded bits that are of the HARQ-ACK in the first UCI and that are mapped onto the first frequency hopping resource, $G_{rvd}^{ACK}(1)$ is a quantity of coded bits that can be mapped onto reserved REs in the first frequency hopping resource, and the reserved REs in the first frequency hopping resource is reserved for transmitting potential HARQ-ACK which has less than or equal to 2 bits.

6. The communications apparatus according to claim 5, wherein:

$G_{rvd}^{ACK}(1) = N_L \cdot Q_m \cdot \lceil G_{rvd}^{ACK}/(2 \cdot N_L \cdot Q_m) \rceil$), $G^{ACK}(1) \min = (N_L \cdot Q_m \cdot \lceil G^{ACK}/(2 \cdot N_L \cdot Q_m) \rceil, M_3 \cdot N_L \cdot Q_m)$, wherein $G_{rvd}^{ACK}$ is a sum of a quantity of coded bits mapped onto the reserved REs in the first frequency hopping resource and a quantity of coded bits mapped onto reserved REs in the second frequency hopping resource, wherein $G^{ACK}$ is a quantity of coded bits of the HARQ-ACK in the first UCI, and wherein $M_3$ is a quantity of REs that are after a first group of consecutive demodulation reference signal (DMRS) symbols on the first frequency hopping resource and are capable of being used to carry data.

7. A communications apparatus, comprising:
one or more processors; and
a storage medium storing program instructions, wherein, when executed by the one or more processors, the program instructions cause the communications apparatus to:
send downlink control information, wherein the downlink control information is used to schedule a physical uplink shared channel (PUSCH), wherein the PUSCH is used to carry only first uplink control information (UCI), wherein the PUSCH comprises a first frequency hopping resource and a second frequency hopping resource, and wherein a time-domain start symbol of the first frequency hopping resource is before a time-domain start symbol of the second frequency hopping resource; and
receive the first UCI on the PUSCH, wherein the first UCI comprises a channel state information part 1 (CSI-part1), or the first UCI comprises a hybrid automatic repeat request-acknowledgment (HARQ-ACK) and the CSI-part1, wherein:

when a quantity of HARQ-ACK bits is greater than 2, $G^{CSI\text{-}part1}(1) = \min(N_L \cdot Q_m \cdot \lfloor G^{CSI\text{-}part1}/(2 \cdot N_L \cdot Q_m) \rfloor, M_1 \cdot N_L \cdot Q_m - G^{ACK}(1))$;

when a quantity of HARQ-ACK bits is less than or equal to 2, $G^{CSI\text{-}part1}(1) = \min(N_L \cdot Q_m \cdot \lfloor G^{CSI\text{-}part1}/(2 \cdot N_L \cdot Q_m) \rfloor, M_1 \cdot N_L \cdot Q_m - G_{rvd}^{ACK}(1))$;

wherein $G^{CSI\text{-}part1}(1)$ is a quantity of coded bits that are of the CSI-part1 in the first UCI and that are mapped onto the first frequency hopping resource, $G^{CSI\text{-}part1}$ a quantity of coded bits of the CSI-part1 in the first UCI;

$$M_1 = \sum_{l=0}^{N_{symb,hop}^{PUSCH}(1)-1} M_{SC}^{UCI}(l),$$

$N_{symb,hop}^{PUSCH}(1)$ is a quantity of symbols in the first frequency hopping resource, $M_{sc}^{UCI}(l)$ is a quantity of resource elements (REs) that can carry UCI on a symbol l, $N_L$ is a quantity of transmission layers of the PUSCH, $Q_m$ is a modulation order of the PUSCH, $G^{ACK}(1)$ is a quantity of coded bits that are of the HARQ-ACK in the first UCI and that are mapped onto the first frequency hopping resource, $G_{rvd}^{ACK}(1)$ is a quantity of coded bits that can be mapped onto reserved REs in the first frequency hopping resource, and the reserved REs in the first frequency hopping resource is reserved for transmitting potential HARQ-ACK which has less than or equal to 2 bits.

8. The communications apparatus according to claim 7, wherein:

$G_{rvd}^{ACK}(1) = N_L \cdot Q_m \cdot \lceil G_{rvd}^{ACK}/(2 \cdot N_L \cdot Q_m) \rceil$), $G^{ACK}(1) \min = (N_L \cdot Q_m \cdot \lceil G^{ACK}/(2 \cdot N_L \cdot Q_m) \rceil, M_3 \cdot N_L \cdot Q_m)$, wherein $G_{rvd}^{ACK}$ is a sum of a quantity of coded bits mapped onto the reserved REs in the first frequency hopping resource and a quantity of coded bits mapped onto reserved REs in the second frequency hopping resource, wherein $G^{ACK}$ is a quantity of coded bits of the HARQ-ACK in the first UCI, and wherein $M_3$ is a quantity of REs that are after a first group of consecutive demodulation reference signal (DMRS) symbols on the first frequency hopping resource and are capable of being used to carry data.

* * * * *

UNITED STATES PATENT AND TRADEMARK OFFICE
CERTIFICATE OF CORRECTION

PATENT NO. : 11,962,522 B2
APPLICATION NO. : 17/172396
DATED : April 16, 2024
INVENTOR(S) : Hao Sun, Wenwen Huang and Yan Cheng It is certified that error appears in the above-identified patent and that said Letters Patent is hereby corrected as shown below:

On the Title Page

Column 1 (item (72) Inventors), please delete "Xi'ian (CN);" and insert therefore -- Xi'an (CN); --;

In the Claims

Column 33, Line 1, Claim 1, please delete "$G^{CSI\text{-}part1}(1)$" and insert therefore -- $G^{CSI\text{-}part1}$ --;

Column 33, Line 14, Claim 1, please delete "$G^{ACK}(1)$" and insert therefore -- $G^{ACK}(1)$ --;

Column 33, Line 17, Claim 1, please delete "$G_{rvd}^{ACK}(1)$" and insert therefore -- $G_{rvd}^{ACK}(1)$ --;

Column 33, Line 23, Claim 2, please delete "$G_{rvd}^{ACK}(1)=N_L \cdot Q_m \cdot \lceil G_{rvd}^{ACK}/(2 \cdot N_L \cdot Q_m)\rceil),$" and insert therefore -- $G_{rvd}^{ACK}(1)=N_L \cdot Q_m \cdot \lfloor G_{rvd}^{ACK}/(2 \cdot N_L \cdot Q_m)\rfloor$, --;

Column 33, Line 24, Claim 2, please delete "$G^{ACK}(1)min=(N_L \cdot Q_m \cdot \lceil G^{ACK}/(2 \cdot N_L \cdot Q_m)\rceil),M_3 \cdot N_L \cdot Q_m),$" and insert therefore -- $G^{ACK}(1)=min(N_L \cdot Q_m \cdot \lfloor G^{ACK}/(2 \cdot N_L \cdot Q_m)\rfloor,M_3 \cdot N_L \cdot Q_m)$, --;

Column 34, Line 1, Claim 3, before "quantity" insert therefore -- is a --;

Column 34, Line 2, Claim 3, please delete "$M_{sc}^{UCI}(l)$" and insert therefore -- $M_{sc}^{UCI}(l)$ --;

Column 34, Line 5, Claim 3, please delete "$G^{ACK}(1)$" and insert therefore -- $G^{ACK}(1)$ --;

Column 34, Line 8, Claim 3, please delete "$G_{rvd}^{ACK}(1)$" and insert therefore -- $G_{rvd}^{ACK}(1)$ --;

Column 34, Line 14, Claim 4, please "$G_{rvd}^{ACK}(1)=N_L \cdot Q_m \cdot \lceil G_{rvd}^{ACK}/(2 \cdot N_L \cdot Q_m)\rceil),$" and insert therefore -- $G_{rvd}^{ACK}(1)=N_L \cdot Q_m \cdot \lfloor G_{rvd}^{ACK}/(2 \cdot N_L \cdot Q_m)\rfloor$, --;

Signed and Sealed this
Twentieth Day of August, 2024

*Katherine Kelly Vidal*

Katherine Kelly Vidal
*Director of the United States Patent and Trademark Office*

CERTIFICATE OF CORRECTION (continued)
U.S. Pat. No. 11,962,522 B2

Column 34, Line 15, Claim 4, please "$G^{ACK}(1)min=(N_L \cdot Q_m \cdot \lceil G^{ACK}/(2 \cdot N_L \cdot Q_m) \rceil, M_3 \cdot N_L \cdot Q_m)$," and insert therefore -- $G^{ACK}(1)=min(N_L \cdot Q_m \cdot \lceil G^{ACK}/(2 \cdot N_L \cdot Q_m) \rceil, M_3 \cdot N_L \cdot Q_m)$, --;

Column 34, Line 65, Claim 5, please delete "$M_{sc}^{UCI}$ (l)" and insert therefore -- $M_{sc}^{UCI}(l)$ --;

Column 35, Line 1, Claim 5, please delete "$G^{ACK}$ (1)" and insert therefore -- $G^{ACK}(1)$ --;

Column 35, Line 12, Claim 6, please delete "$G_{rvd}^{ACK}(1)=N_L \cdot Q_m \cdot \lceil G_{rvd}^{ACK}/(2 \cdot N_L \cdot Q_m) \rceil)$," and insert therefore -- $G_{rvd}^{ACK}(1)=N_L \cdot Q_m \cdot \lceil G_{rvd}^{ACK}/(2 \cdot N_L \cdot Q_m) \rceil$, --;

Column 35, Line 13, Claim 6, please delete "$G^{ACK}(1)min=(N_L \cdot Q_m \cdot \lceil G^{ACK}/(2 \cdot N_L \cdot Q_m) \rceil), M_3 \cdot N_L \cdot Q_m)$," and insert therefore -- $G^{ACK}(1)=min(N_L \cdot Q_m \cdot \lceil G^{ACK}/(2 \cdot N_L \cdot Q_m) \rceil, M_3 \cdot N_L \cdot Q_m)$, --;

Column 36, Line 7, Claim 7, please delete "$G^{CSI-part1}$ (1)" and insert therefore -- $G^{CSI-part1}(1)$ --;

Column 36, Line 9, Claim 7, before "a" insert therefore -- is --;

Column 36, Line 21, Claim 7, please delete "$G^{ACK}$ (1)" and insert therefore -- $G^{ACK}(1)$ --;

Column 36, Line 31, Claim 8, please delete "$G_{rvd}^{ACK}(1)=N_L \cdot Q_m \cdot \lceil G_{rvd}^{ACK}/(2 \cdot N_L \cdot Q_m) \rceil)$," and insert therefore -- $G_{rvd}^{ACK}(1)=N_L \cdot Q_m \cdot \lceil G_{rvd}^{ACK}/(2 \cdot N_L \cdot Q_m) \rceil$, --;

Column 36, Line 32, Claim 8, please delete "$G^{ACK}(1)min=(N_L \cdot Q_m \cdot \lceil G^{ACK}/(2 \cdot N_L \cdot Q_m) \rceil, M_3 \cdot N_L \cdot Q_m)$," and insert therefore -- $G^{ACK}(1)=min(N_L \cdot Q_m \cdot \lceil G^{ACK}/(2 \cdot N_L \cdot Q_m) \rceil, M_3 \cdot N_L \cdot Q_m)$, --.